US009916517B2

(12) United States Patent
Raghoebardajal et al.

(10) Patent No.: US 9,916,517 B2
(45) Date of Patent: Mar. 13, 2018

(54) IMAGE PROCESSING METHOD AND APPARATUS

(71) Applicant: Sony Interactive Entertainment Europe Limited, London (GB)

(72) Inventors: Sharwin Winesh Raghoebardajal, London (GB); Ian Henry Bickerstaff, London (GB)

(73) Assignee: Sony Interactive Entertainment Europe Limited (GB)

( * ) Notice: Subject to any disclaimer, the term of this patent is extended or adjusted under 35 U.S.C. 154(b) by 0 days.

(21) Appl. No.: 14/965,996

(22) Filed: Dec. 11, 2015

(65) Prior Publication Data
US 2016/0171704 A1 Jun. 16, 2016

(30) Foreign Application Priority Data

Dec. 15, 2014 (GB) .................. 1422267.3

(51) Int. Cl.
| | |
|---|---|
| *G06K 9/46* | (2006.01) |
| *G06T 19/00* | (2011.01) |
| *G06T 3/00* | (2006.01) |
| *G06K 9/00* | (2006.01) |
| *G06F 3/01* | (2006.01) |
| *G06T 7/73* | (2017.01) |

(Continued)

(52) U.S. Cl.
CPC .......... *G06K 9/4652* (2013.01); *A63F 13/213* (2014.09); *G06F 3/013* (2013.01);
(Continued)

(58) Field of Classification Search
CPC ... G06T 7/0051; G06T 19/006; G06T 3/0093; G06T 7/0042; G06T 7/2033; G06T 7/408;
(Continued)

(56) References Cited

U.S. PATENT DOCUMENTS

| 2002/0109701 A1 | 8/2002 | Deering |
| 2005/0190989 A1 | 9/2005 | Kondo et al. |

(Continued)

FOREIGN PATENT DOCUMENTS

| CN | 102855660 A | 1/2013 |
| WO | 9939307 A1 | 8/1999 |

OTHER PUBLICATIONS

Extended European Search Report Application No. 15198388.9 dated Apr. 21, 2016.

(Continued)

*Primary Examiner* — Gregory J Tryder
*Assistant Examiner* — Michael Le
(74) *Attorney, Agent, or Firm* — Lerner, David, Littenberg, Krumholz & Mentlik, LLP

(57) ABSTRACT

A method generates an image for display by deriving an expected depth of field for the image and by generating the image for display by the display device by applying a blurring function. The expected depth of field is derived with respect to a point of focus in the image, in response to lighting conditions of the environment represented by the image. The blurring function is applied to simulate the expected depth of field of the image by blurring as a function of apparent spatial depth within the image. The degree of blurring applied to a closer depth region, in an apparent depth direction, to the point of focus is lower than the degree applied to a further depth region from the point of focus. Variation of the blurring function with respect to depth separation from the point of focus depends upon the expected depth of field.

20 Claims, 14 Drawing Sheets

(51) Int. Cl.
*H04N 13/00* (2006.01)
*H04N 13/04* (2006.01)
*A63F 13/213* (2014.01)
*G06T 7/50* (2017.01)
*G06T 7/246* (2017.01)
*G06T 7/90* (2017.01)
*A63F 13/25* (2014.01)

(52) U.S. Cl.
CPC ......... *G06K 9/0061* (2013.01); *G06K 9/4661* (2013.01); *G06T 3/0093* (2013.01); *G06T 7/246* (2017.01); *G06T 7/50* (2017.01); *G06T 7/73* (2017.01); *G06T 7/90* (2017.01); *G06T 19/006* (2013.01); *H04N 13/0018* (2013.01); *H04N 13/044* (2013.01); *H04N 13/0497* (2013.01); *A63F 13/25* (2014.09)

(58) Field of Classification Search
CPC ... G06K 9/0061; G06K 9/4652; G06K 9/4661
USPC ........................................ 345/633
See application file for complete search history.

(56) References Cited

U.S. PATENT DOCUMENTS

| | | | | |
|---|---|---|---|---|
| 2008/0002910 | A1* | 1/2008 | Ojima | G06T 15/00 382/277 |
| 2009/0015679 | A1 | 1/2009 | Hayakawa et al. | |
| 2009/0251553 | A1* | 10/2009 | Cambell | G06F 3/0485 348/211.99 |
| 2011/0018890 | A1* | 1/2011 | Ford | G06T 13/60 345/589 |
| 2011/0064375 | A1* | 3/2011 | Raghoebardajal | G06T 7/20 386/224 |
| 2013/0063566 | A1* | 3/2013 | Morgan-Mar | G06T 7/0069 348/46 |
| 2013/0335404 | A1* | 12/2013 | Westerinen | G06F 3/033 345/419 |
| 2014/0247281 | A1* | 9/2014 | Ellenby | G06T 19/006 345/633 |

OTHER PUBLICATIONS

Search Report for Application No. GB1422267.3 dated Oct. 27, 2015.
Sebastien Hillaire, Anatole Lecuyer, Remi Cozot, Gery Casiez, "Depth-of-Field Blur Effects for First-person navigation in Virtual environments", IEEE Computer Graphics and Applications 2008, vol. 28, Issue 6, pp. 47-55.
Search Report for Application No. GB1422267.3 dated Jun. 11, 2015.
Ng, R. et al., Light Field Photography with a Hand-held Plenoptic Camera, Stanford Tech Report CTSR 2005-02, pp. 1-11, dated 2005.

* cited by examiner

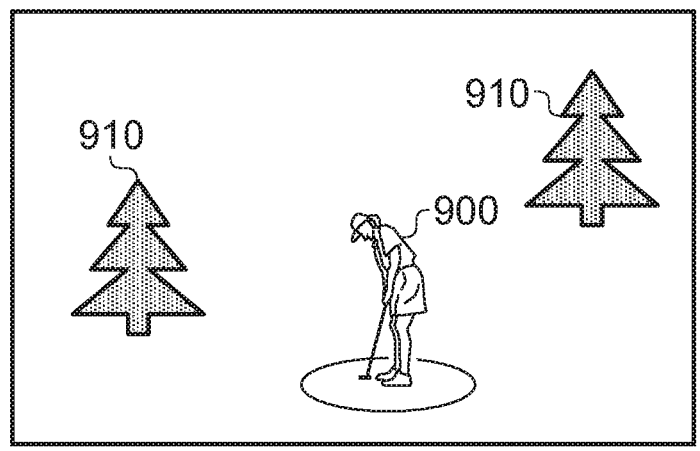
FIG. 18
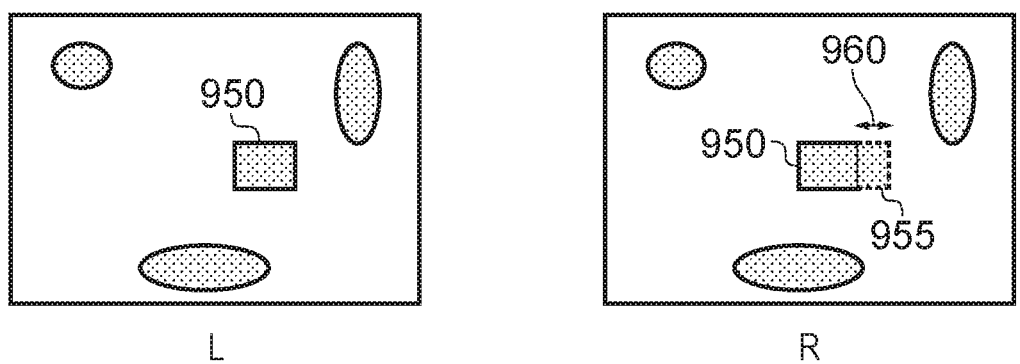
FIG. 19
 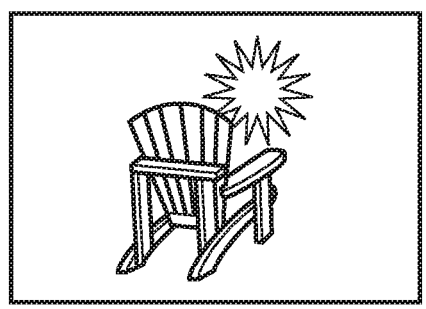
FIG. 20a  FIG. 20b

IMAGE PROCESSING METHOD AND APPARATUS

CROSS REFERENCE TO RELATED APPLICATIONS

The present application claims the benefit of and priority to GB Patent Application No. 1422267.3, filed Dec. 15, 2014, the entire disclosure of which is hereby incorporated by reference herein.

BACKGROUND

Field

This disclosure relates to an image processing method and apparatus.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, is neither expressly or impliedly admitted as prior art against the present disclosure.

Depth of field is an optical quantity that refers to the distance between the nearest and farthest objects that appear acceptably sharp to a viewer. This can relate to a person's field of view, an image or video that is captured, or any other imaging system. Depth of field occurs because although a lens is only able to focus on a single point, the loss of clarity increases gradually either side of that single point in the depth direction rather than as a discrete step change between "focussed" and "blurry" or "unfocused". The "depth" of a point of focus is defined for a viewer as the radial distance from the viewer to the point of focus, such that points of equal depth will form a sphere about the person; the depth of field is also defined along this radial distance either side (in a radial or depth direction) of the point of focus. Depth of field is therefore recognised as an acceptably well focussed region that has boundaries defined by the point at which the loss of focus becomes too great.

This in turn introduces the concept of a stage at which a loss of focus becomes excessive. As mentioned above, precise focus is obtainable only at one radial distance or depth. At that point of focus a point object will produce a point image. At any other radial distance, a point object will produce a blurred spot which will have a size dependent upon how far the point is away from being focused. A threshold may be set for the acceptable size of such a blurred spot such that it is indistinguishable from a point, as seen by the viewer. This threshold may depend upon the manner in which the image is being captured or displayed. For example, an acceptable size of this spot, otherwise known as an acceptable circle of confusion, is established as a practical standard for 35 mm movie images and, separately, for 35 mm stills photography.

But taking these factors into account, in any image capture or display situation, an acceptable circle of confusion can be defined, leading to definable limits on the depth of field in a particular image. An important aspect is the way in which, for real captured images, the depth of field varies according to the aperture size of the arrangement by which the image is captured. Generally speaking, a larger aperture provides a smaller depth of field, and a smaller aperture provides a greater depth of field, other factors being equal. Similarly, the depth of field for a particular point of focus varies with focal length of the imaging system in use, all other factors being equal.

Computer games and films often display images that span a large range of depths, and either as a result of rendering or image capture techniques all of the image may be in focus. Depth is usually conveyed in 2D displays by the use of occlusion and scaling of objects and in 3D images a representation of the apparent 3D depth of each displayed object may also be utilised.

However, when viewing real scenes and objects, a viewer would expect parts of a view to be more blurry relative to the clearer part of the view as this is what a person experiences in day-to-day life. The point of focus of the user is enclosed by region in which the view is relatively sharply focussed, and the size of this region in the depth direction is known as the depth of field as described above.

It is known to render an image with a blurred effect to simulate the depth of field that would be associated with a real object or scene, with methods such as ray tracing. However, these are computationally expensive methods most suitable for images that can be rendered ahead of time which makes them a poor choice for many applications.

SUMMARY

This disclosure is defined by the appended claims.

Video gaming often requires or makes use of responsive rendering, for example games in which the view depends on the actions of the player. This means that depth of field is not often implemented in rendered environments that require short processing times to generate relevant images.

A result of this is that video games are rendered with a full depth of field such that all objects in the view are equally well focussed, or only well-defined most-distant objects (for example, a far-away mountain range) are rendered to appear blurry. This lack of rendering of blur or reliance on only a few predetermined out of focus objects does not necessarily provide a realistic simulation of depth of field. One way of avoiding this problem is to create a game that is played from the third person perspective of a main character. In this case, a realistic depth of field is not expected as the player does not share the view of the main character and therefore a lack of a realistic portrayal of depth of field is not necessarily considered.

However, the present disclosure recognises that an effective simulation of depth of field is desirable in the field of video games because it allows for a more realistic image to be produced, and it is further desirable when used in conjunction with a head mountable display device as it increases the level of immersion that the user experiences.

Accordingly, at least in embodiments of the present disclosure, methods and apparatus are provided for simulating an apparent depth of field on the basis of either observable aspects of the viewer, such as the viewer's pupil dilation (which would affect the viewer's perceived depth of field in real life) or detectable aspects of the environment being portrayed in a rendered image or virtual world such as the portrayed image brightness.

The techniques described in the present disclosure may relate to either the 2-dimensional or 3-dimensional display of images and video. Simulating depth of field is particularly relevant to 3D use, as immersion is often a desired feature (especially when an HMD is the display device); therefore simulating a view to correctly or at least more appropriately match a user's expectations is advantageous to the display method.

It is to be understood that both the foregoing general description and the following detailed description are exemplary, but are not restrictive, of the present technology.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 18 schematically illustrates an image with a determined most significant feature;

FIG. 19 schematically illustrates lateral disparity between complementary stereoscopic images;

FIGS. 20a and 20b schematically illustrate scenes with different colour and luminance properties;

DESCRIPTION OF THE EMBODIMENTS

Head Mountable Displays

Embodiments of the present disclosure can provide a display method and apparatus using a display operable to display an image to a viewer. In some embodiments, the display is a head-mountable display and the position and/or orientation of the viewer's head is detected by detecting a position and/or orientation of the head-mountable display. The head mountable display may have a frame to be mounted onto an viewer's head, the frame defining one or two eye display positions which, in use, are positioned in front of a respective eye of the viewer and a respective display element is mounted with respect to each of the eye display positions, the display element providing a virtual image of a video display of a video signal from a video signal source to that eye of the viewer. In other examples, the display is not a head-mountable display. In some embodiments, the display (whether head mountable or not) may be referred to as an immersive display, in that in normal use it fills at least a threshold angular range (for example, at least 40°) of the field of view of the user. Examples include multiple projector displays, wrap-around (curved) displays and the like.

Figure 1:
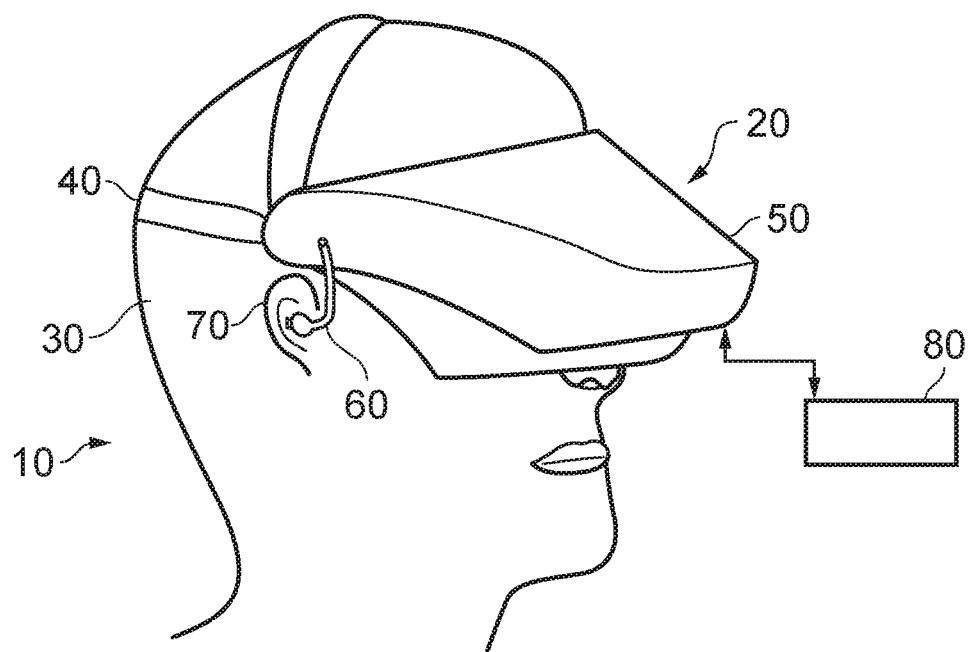
FIG. 1 schematically illustrates an HMD worn by a user.

Referring now to FIG. 1, a user 10 is wearing an HMD 20 on the user's head 30. The HMD comprises a frame 40, in this example formed of a rear strap and a top strap, and a display portion 50.

The HMD of FIG. 1 completely obscures the user's view of the surrounding environment. All that the user can see is the pair of images displayed within the HMD.

The HMD has associated headphone earpieces 60 which fit into the user's left and right ears 70. The earpieces 60 replay an audio signal provided from an external source, which may be the same as the video signal source which provides the video signal for display to the user's eyes.

In operation, a video signal is provided for display by the HMD. This could be provided by an external video signal source 80 such as a video games machine or data processing apparatus (such as a personal computer), in which case the signals could be transmitted to the HMD by a wired or a wireless connection. Examples of suitable wireless connections include Bluetooth (R) connections. Audio signals for the earpieces 60 can be carried by the same connection. Similarly, any control signals passed from the HMD to the video (audio) signal source may be carried by the same connection.

Accordingly, the arrangement of FIG. 1 provides an example of a head-mountable display system comprising a frame to be mounted onto an observer's head, the frame defining one or two eye display positions which, in use, are positioned in front of a respective eye of the observer and a display element mounted with respect to each of the eye display positions, the display element providing a virtual image of a video display of a video signal from a video signal source to that eye of the observer.

FIG. 1 shows just one example of an HMD. Other formats are possible: for example an HMD could use a frame more similar to that associated with conventional eyeglasses, namely a substantially horizontal leg extending back from the display portion to the top rear of the user's ear, possibly curling down behind the ear. In other examples, the user's view of the external environment may not in fact be entirely obscured; the displayed images could be arranged so as to be superposed (from the user's point of view) over the external environment. An example of such an arrangement will be described below with reference to FIG. 4.

Figure 2:
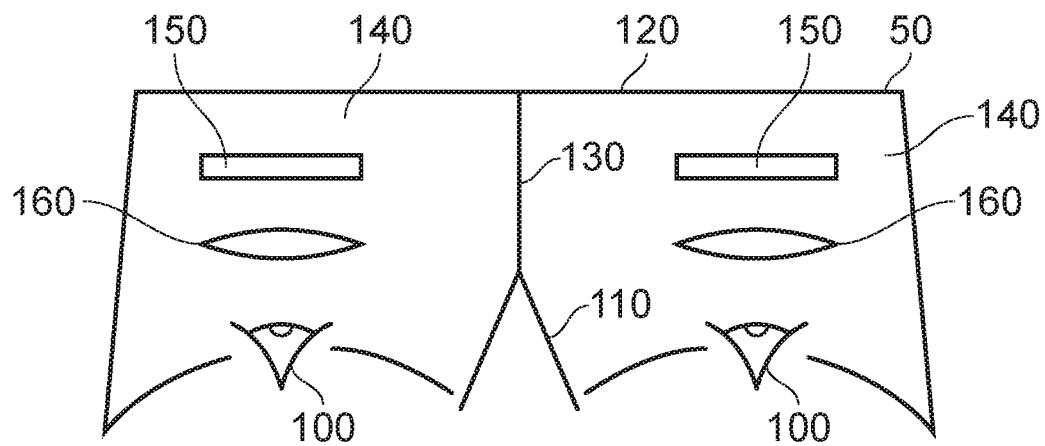
FIG. 2 is a schematic plan view of an HMD.

In the example of FIG. 1, a separate respective display is provided for each of the user's eyes. A schematic plan view of how this is achieved is provided as FIG. 2, which illustrates the positions 100 of the user's eyes and the relative position 110 of the user's nose. The display portion 50, in schematic form, comprises an exterior shield 120 to mask ambient light from the user's eyes and an internal shield 130 which prevents one eye from seeing the display intended for the other eye. The combination of the user's face, the exterior shield 120 and the interior shield 130 form two compartments 140, one for each eye. In each of the compartments there is provided a display element 150 and one or more optical elements 160. The way in which the display element and the optical element(s) cooperate to provide a display to the user will be described with reference to FIG. 3.

Figure 3:
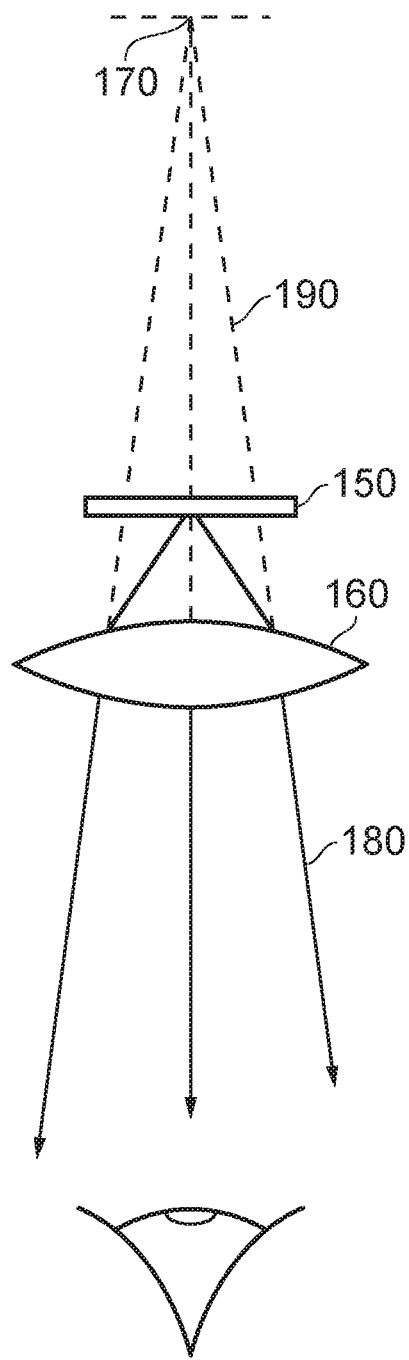
FIG. 3 schematically illustrates the formation of a virtual image by an HMD.

Referring to FIG. 3, the display element 150 generates a displayed image which is (in this example) refracted by the optical elements 160 (shown schematically as a convex lens but which could include compound lenses or other elements) so as to generate a virtual image 170 which appears to the user to be larger than and significantly further away than the real image generated by the display element 150. As an example, the virtual image may have an apparent image size (image diagonal) of more than 1 m and may be disposed at a distance of more than 1 m from the user's eye (or from the frame of the HMD). In general terms, depending on the purpose of the HMD, it is desirable to have the virtual image disposed a significant distance from the user. For example, if the HMD is for viewing movies or the like, it is desirable that the user's eyes are relaxed during such viewing, which requires a distance (to the virtual image) of at least several meters. In FIG. 3, solid lines (such as the line 180) are used to denote real optical rays, whereas broken lines (such as the line 190) are used to denote virtual rays.

Figure 4:
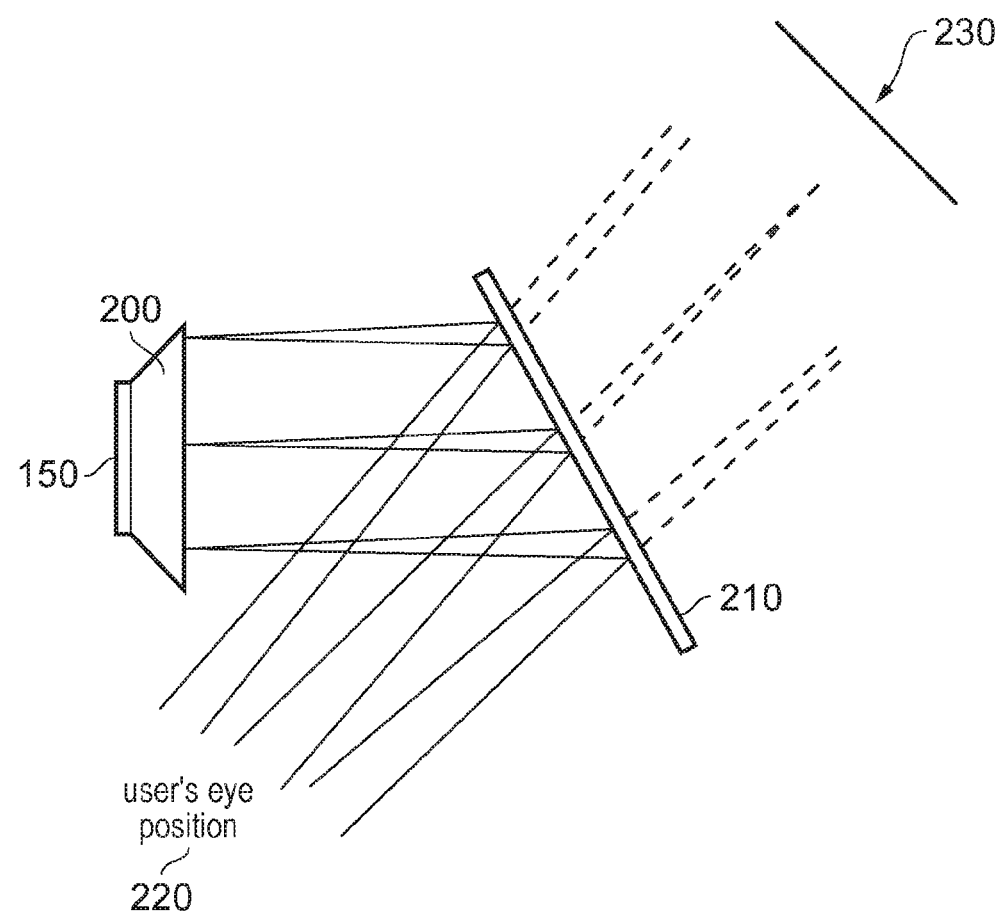
FIG. 4 schematically illustrates another type of display for use in an HMD.

An alternative arrangement is shown in FIG. 4. This arrangement may be used where it is desired that the user's view of the external environment is not entirely obscured. However, it is also applicable to HMDs in which the user's external view is wholly obscured. In the arrangement of FIG. 4, the display element 150 and optical elements 200 cooperate to provide an image which is projected onto a mirror 210, which deflects the image towards the user's eye position 220. The user perceives a virtual image to be located at a position 230 which is in front of the user and at a suitable distance from the user.

In the case of an HMD in which the user's view of the external surroundings is entirely obscured, the mirror 210 can be a substantially 100% reflective mirror. The arrangement of FIG. 4 then has the advantage that the display element and optical elements can be located closer to the centre of gravity of the user's head and to the side of the user's eyes, which can produce a less bulky HMD for the user to wear. Alternatively, if the HMD is designed not to completely obscure the user's view of the external environment, the mirror 210 can be made partially reflective so that the user sees the external environment, through the mirror 210, with the virtual image superposed over the real external environment.

Figure 5:
FIG. 5 schematically illustrates a pair of stereoscopic images.

In the case where separate respective displays are provided for each of the user's eyes, it is possible to display stereoscopic images. An example of a pair of stereoscopic images for display to the left and right eyes is shown in FIG. 5. The images exhibit a lateral displacement relative to one another, with the displacement of image features depending upon the (real or simulated) lateral separation of the cameras by which the images were captured, the angular convergence of the cameras and the (real or simulated) distance of each image feature from the camera position.

Note that the lateral displacements in FIG. 5 (and those in FIG. 19 to be described below) could in fact be the other way round, which is to say that the left eye image as drawn could in fact be the right eye image, and the right eye image as drawn could in fact be the left eye image. This is because some stereoscopic displays tend to shift objects to the right in the right eye image and to the left in the left eye image, so as to simulate the idea that the user is looking through a stereoscopic window onto the scene beyond. However, some HMDs use the arrangement shown in FIG. 5 because this gives the impression to the user that the user is viewing the scene through a pair of binoculars. The choice between these two arrangements is at the discretion of the system designer.

In some situations, an HMD may be used simply to view movies and the like. In this case, there is no change required to the apparent viewpoint of the displayed images as the user turns the user's head, for example from side to side. In other uses, however, such as those associated with virtual reality (VR) or augmented reality (AR) systems, the user's viewpoint needs to track movements with respect to a real or virtual space in which the user is located.

This tracking is carried out by detecting motion of the HMD and varying the apparent viewpoint of the displayed images so that the apparent viewpoint tracks the motion.

Figure 6:
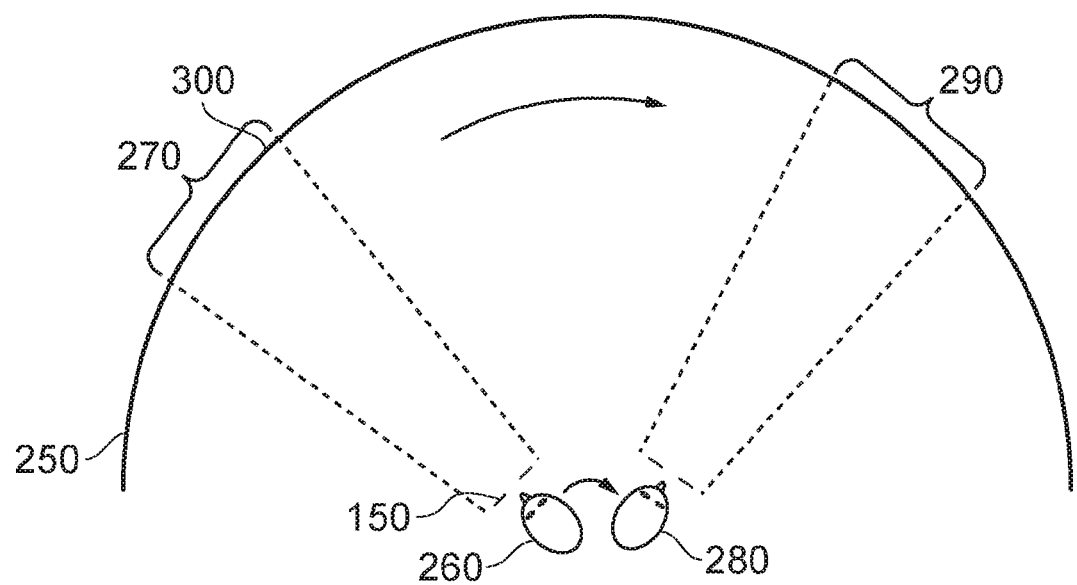
FIG. 6 schematically illustrates a change of view of user of an HMD.

FIG. 6 schematically illustrates the effect of a user head movement in a VR or AR system.

Referring to FIG. 6, a virtual environment is represented by a (virtual) spherical shell 250 around a user. Because of the need to represent this arrangement on a two-dimensional paper drawing, the shell is represented by a part of a circle, at a distance from the user equivalent to the separation of the displayed virtual image from the user. A user is initially at a first position 260 and is directed towards a portion 270 of the virtual environment. It is this portion 270 which is represented in the images displayed on the display elements 150 of the user's HMD.

Consider the situation in which the user then moves his head to a new position and/or orientation 280. In order to maintain the correct sense of the virtual reality or augmented reality display, the displayed portion of the virtual environment also moves so that, at the end of the movement, a new portion 290 is displayed by the HMD.

So, in this arrangement, the apparent viewpoint within the virtual environment moves with the head movement. If the head rotates to the right side, for example, as shown in FIG. 6, the apparent viewpoint also moves to the right from the user's point of view. If the situation is considered from the aspect of a displayed object, such as a displayed object 300, this will effectively move in the opposite direction to the head movement. So, if the head movement is to the right, the apparent viewpoint moves to the right but an object such as the displayed object 300 which is stationary in the virtual environment will move towards the left of the displayed image and eventually will disappear off the left-hand side of the displayed image, for the simple reason that the displayed portion of the virtual environment has moved to the right whereas the displayed object 300 has not moved in the virtual environment. Similar considerations apply to the up-down component of any motion.

Games Console and HMD

Figure 7:
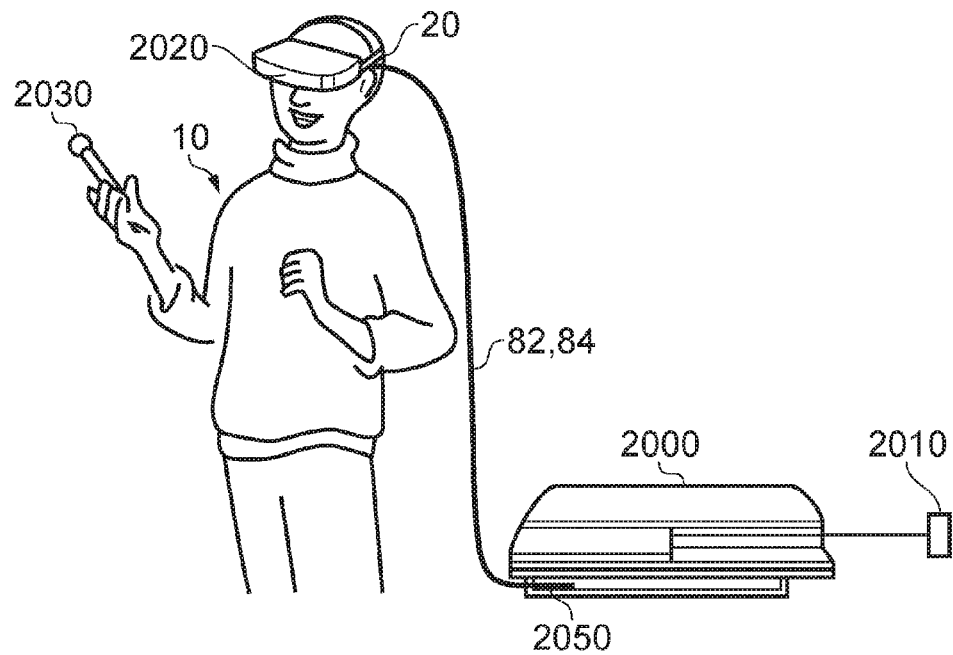
FIGS. 7 and 8 schematically illustrate a user wearing an HMD connected to a Sony® PlayStation 3® games console.

FIG. 7 schematically illustrates a user wearing an HMD connected to a Sony® PlayStation 3® games console 2000 as an example of a base device (corresponding to the external video source 80 of FIG. 1), a further example of a base device is a PlayStation 4® games console. The games console 2000 is connected to a mains power supply 2010 and (optionally) to a main display screen (not shown). A cable, acting as the cables 82, 84 discussed above (and so acting as both power supply and signal cables), links the HMD 20 to the games console 2000 and is, for example, plugged into a USB socket 2020 on the console 2000. Note that in the present embodiments, a single physical cable is provided which fulfils the functions of the cables 82, 84. In FIG. 6, the user is also shown holding a hand-held controller 2030 which may be, for example, a Sony® Move® controller which communicates wirelessly with the games console 2000 to control (or to contribute to the control of) game operations relating to a currently executed game program.

The video displays in the HMD 20 are arranged to display images generated by the games console 2000, and the earpieces 60 in the HMD 20 are arranged to reproduce audio signals generated by the games console 2000. Note that if a USB type cable is used, these signals will be in digital form when they reach the HMD 20, such that the HMD 20 comprises a digital to analogue converter (DAC) to convert at least the audio signals back into an analogue form for reproduction.

Images from the camera 2050 mounted on the HMD 20 are passed back to the games console 2000 via the cable 82, 84. Similarly, if motion or other sensors are provided at the HMD 20, signals from those sensors may be at least partially processed at the HMD 20 and/or may be at least partially processed at the games console 2000. The use and processing of such signals will be described further below.

The USB connection from the games console 2000 also provides power to the HMD 20, according to the USB standard.

Figure 8:
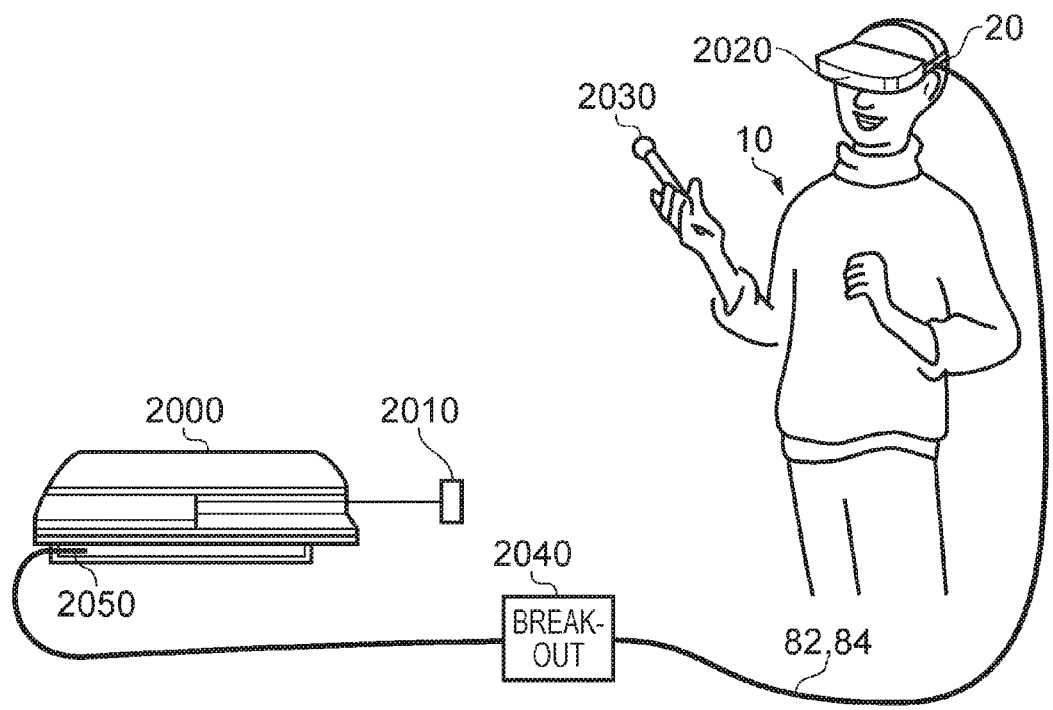

FIG. 8 schematically illustrates a similar arrangement in which the games console is connected (by a wired or wireless link) to a so-called "break out box" acting as a base or intermediate device 2040, to which the HMD 20 is connected by a cabled link 82, 84. The breakout box has various functions in this regard. One function is to provide a location, near to the user, for some user controls relating to the operation of the HMD, such as (for example) one or more of a power control, a brightness control, an input source selector, a volume control and the like. Another function is to provide a local power supply for the HMD (if one is needed according to the embodiment being discussed). Another function is to provide a local cable anchoring point. In this last function, it is not envisaged that the break-out box 2040 is fixed to the ground or to a piece of furniture, but rather than having a very long trailing cable from the games console 2000, the break-out box provides a locally weighted point so that the cable 82, 84 linking the HMD 20 to the break-out box will tend to move around the position of the break-out box. This can improve user safety and comfort by avoiding the use of very long trailing cables.

It will be appreciated that the localisation of processing in the various techniques described in this application can be varied without changing the overall effect, given that an HMD may form part of a set or cohort of interconnected devices (that is to say, interconnected for the purposes of data or signal transfer, but not necessarily connected by a physical cable). So, processing which is described as taking place "at" one device, such as at the HMD, could be devolved to another device such as the games console (base device) or the break-out box. Processing tasks can be shared amongst devices. Source signals, on which the processing is to take place, could be distributed to another device, or the processing results from the processing of those source signals could be sent to another device, as required. So any references to processing taking place at a particular device should be understood in this context. Similarly, where an interaction between two devices is basically symmetrical, for example where a camera or sensor on one device detects a signal or feature of the other device, it will be understood that unless the context prohibits this, the two devices could be interchanged without any loss of functionality.

As mentioned above, in some uses of the HMD, such as those associated with virtual reality (VR) or augmented reality (AR) systems, the user's viewpoint needs to track movements with respect to a real or virtual space in which the user is located.

This tracking is carried out by detecting motion of the HMD and varying the apparent viewpoint of the displayed images so that the apparent viewpoint tracks the motion.

Depth of Field

Aspects of the technical concept of depth of field will now be discussed, starting with a discussion of FIG. 9.

Figure 9:
FIG. 9 schematically illustrates an example of depth of field.

The depth of field is shown in FIG. 9, for an eye 400 (or indeed any image capturing arrangement) focussing on an object 410 at a distance 420. This object is therefore said to be at the point of focus. The depth of field is represented by a line 430, which extends for a distance in front of and behind the object 410 relative to the viewer (that is to say, in a radial or depth direction).

Depth of field is defined as the size of the region (in the depth direction) in which an image is sufficiently well focussed for an application. As discussed above, the focus of an image is often quantified using a circle of confusion, which is an optical (blur) spot caused when imaging a point source due to imperfect focus. The size of this spot is used as an objective measure of the limits of the depth of field region, where a maximum allowed size of spot is specified for a given application. The depth of field region can therefore be thought of as a region of relatively sharply focussed images surrounded by regions of relative blurriness.

Figure 10:
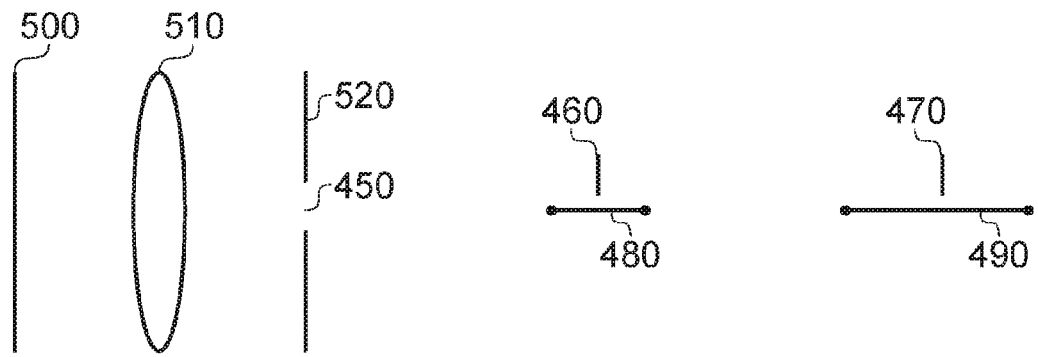
FIG. 10 schematically illustrates depth of field varying with respect to point of focus distance.

As shown in FIG. 10, the depth of field experienced by a person focussing on an object varies with the distance to the object. As shown, where an object is nearer to the lens, the depth of field associated with it is smaller (at least, in absolute terms) and for an object further away from the lens, the depth of field associated with it is correspondingly larger (in absolute terms).

In particular, a system comprising a focal plane 500 (a plane onto which a real image is focused), a lens 510, a diaphragm 520 defining an aperture 450 (which together comprise an example imaging system, such as an eye) focuses on two objects 460 and 470 in turn. The depth of field 480 associated with the object 460 is small (in absolute terms) in comparison to the depth of field 490 associated with the object 470.

Figure 11A:
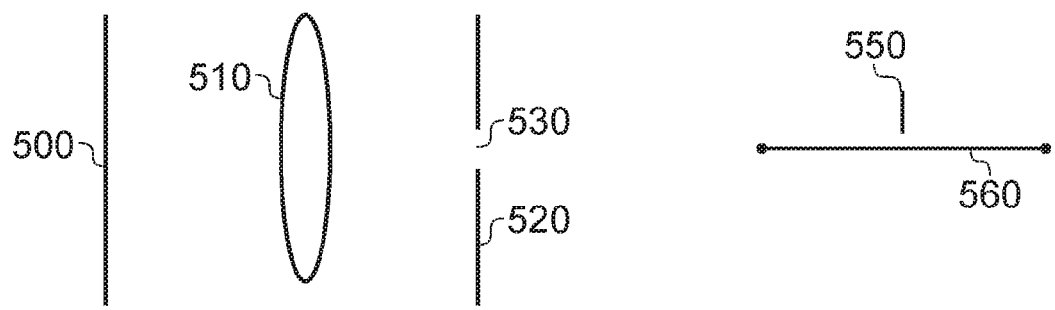
FIGS. 11a and 11b schematically illustrate depth of field varying with respect to aperture size.
Figure 11B:
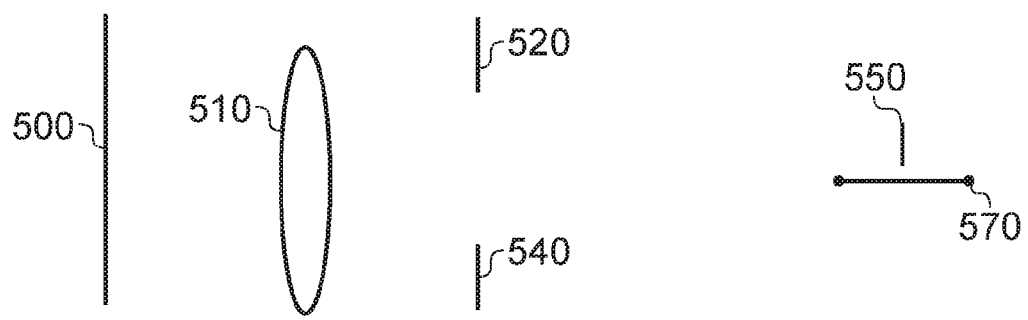

Additionally, the depth of field associated with an object at a fixed point of focus may vary with the size of the aperture 450. FIGS. 11*a* and 11*b* represent the same imaging system as that shown in FIG. 10, with a varying aperture width or diameter. In FIG. 11a, an aperture 530 is associated with a depth of field 560 about an object 550. In FIG. 11b however, an aperture 540 is significantly larger than the aperture 530 and as a result the depth of field 570 associated with the same object 550 at the same point of focus is considerably smaller. This is to say that the depth of field associated with an imaging system increases with decreasing aperture size being utilised in the system.

Figure 12:
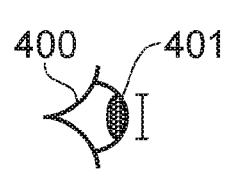
FIG. 12 schematically illustrates varying pupil size with respect to brightness conditions.
Figure 12:
Figure 12:
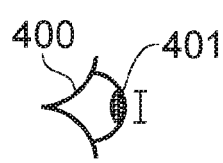
Figure 12:
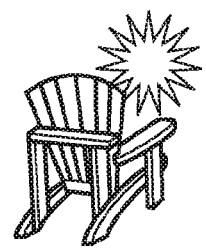

As a direct result of this, the depth of field associated with a view of a real scene as observed by a viewer's eye 400 in FIG. 12 is influenced in part by the brightness of the scene itself. This is because a pupil 401 of the viewer's eye acts as an aperture, the size of which tends to vary (by action of the human psychovisual system) in response to incident light. As a result, in a well-lit environment (for example, a sunny day 403), the pupil 401 contracts (creating a smaller aperture) to prevent too much light entering the eye and as shown in FIG. 11a this results in a greater depth of field. A differing scenario is that of a day with less lighting (for example, a rainy day 402) in which there is less light and so the pupil 401 remains dilated in order to allow an appropriate amount of light into the eye. As seen by a comparison with FIG. 11b, this pupil dilation results in a small depth of field.

Similarly, the depth of field for a particular point of focus varies with focal length of the imaging system in use, all other factors being equal. In the case of a viewer's eye, the focal length of the eye's imaging system does not vary, but (as discussed below), if the user is viewing an image on a display screen which has been captured by (or rendered so as to appear to have been captured by) a camera, the depth of field can depend upon the focal length of the imaging system of the camera or the simulated camera.

The situation of a viewer observing a scene displayed on a display screen will now be discussed. The depth of field associated with the scene is not experienced naturally by a person viewing an image on a display screen due to the fact that the display screen is generally a flat surface, and therefore all portions of the images shown on the screen are (more or less) equidistant from the viewer's eyes. In the case of a captured image, for example an image captured using a camera, the depth of field corresponding to the imaging system and aperture of the camera will be represented in the displayed image. However, in the case of a rendered image, for example an image rendered as part of the operation of a computer games machine, the rendering system may apply blurring of an image (prior to being displayed for viewing) corresponding to the expected depth of field in order to simulate the view which the viewer would expect to see, if the viewer were viewing a corresponding real scene naturally.

This simulation of depth of field is achieved by calculating the depth of field that a user would expect if they were viewing the scene portrayed by the displayed image outside of the display, as if they were viewing a 'real world' scene, and then attempting to reproduce in the rendering process the level of sharpness that would be obtained at each depth in the image.

To calculate an expected depth of field several factors may be taken into consideration including: distance of the point of focus of the viewer, apparent brightness of the image (so as to simulate a virtual pupil diameter, as discussed later in the description), physical pupil diameter of the viewer and, in the case of an image simulating a view captured by a camera, the focal length of the simulated camera. This selection of physical (or simulated physical) factors could further be supplemented by other factors, such as the importance of the object being rendered in a game, to adjust the depth of field experienced by the viewer as a compromise between realism and providing useful information. In other examples, a depth of field could be applied that is in fact unexpected (by a user) in order to provide a novel gaming experience for example.

The apparent depth of objects in an image is a measure of how near or far from the user they appear to be in a radial direction, which may be approximated to the depth direction. Depth is usually conveyed in 2D images through the use of attributes such as relative size and occlusion, and is used widely to increase the level of realism and immersion experienced by a viewer. So, an object which is to be portrayed, in a rendered 2D image, as being further away from the user would be rendered so as to be smaller within the image, and would also be subject to potential occlusion by nearer objects. Further attributes such as lighting, the direction of shadows and the specular reflections of other objects can be used to simulate apparent depth in a 2D object.

However, in previously proposed arrangements for the portrayal of apparent depth the depth of field is not necessarily considered and thus the level of focus at all regions in the image is often the same and therefore only correct (relative to the expected depth of field) for parts of the image. As a result, depth of field simulation can be used to improve the realism of a rendered image and thus increase the level of immersion experienced by a viewer.

As mentioned above, if other factors are equal, the depth of field (for a real scene) depends on the aperture size of the imaging apparatus. In the case of viewing by the human eye, the depth of field (for a real scene) as perceived by the viewer depends on the viewer's pupil size.

Embodiments of the present technique will now be described which relate a simulation of depth of field, in a rendered image, to one or both of:

(a) the actual current physical pupil size of the user, as detected by (for example) a camera or other detector; and/or (b) a simulation or estimation of the current pupil size of the viewer (as a virtual pupil size), based on a detection or properties of the currently displayed images and an estimation of the effect that the currently displayed images would have on the viewer's pupil size if the viewer were looking at an equivalent real scene. Note that this is a simulation of what the pupil size would be if the user were viewing that type of image in the real world. The physical pupil size is dependent upon the display brightness and may be different to the virtual pupil size which depends upon the nature of the scene being portrayed by the currently displayed image.

Looking first at (a), a detection of the viewer's current physical pupil size, it was discussed above that the physical pupil size causes a variation in the depth of field as perceived by the viewer. In the case of a rendered image displayed on a display screen, the physical depth of field is almost irrelevant because all points on the display screen (or, in the case of an HMD, a virtual image of a display screen) are at almost the same radial distance from the viewer. But embodiments of the present disclosure simulate, in a rendered image to be displayed by such an arrangement, a simulation of the depth of field which the viewer would expect to see, based on the viewer's current physical pupil size.

Turning to the factor (b), it is noted that the dynamic brightness range of images displayed on a display screen is often rather less than the corresponding dynamic brightness range of equivalent real scenes. That is to say, in real life, the ratio between the actual brightness of a bright sunny day and that of a dull rainy day might be far greater than the ratio between the brightness of a rendered image of a bright sunny day and the brightness of a rendered image of a dull rainy day. So, in real life, the ratio of the viewer's pupil size on the real bright sunny day to the pupil size on the dull rainy day might be much greater than (or at least different to) the corresponding ratio when the viewer is viewing respective rendered images of a sunny and a dull day. The overall result is that a measurement of the viewer's pupil size alone, as discussed under factor (a) above, may not provide sufficient variation (as between images of bright scenes and images of dull scenes) to allow the simulation of a believable change in the viewer's depth of field.

One possible solution is to apply a gain or a gearing to the detected physical pupil size in (a), so that small changes in physical pupil size give rise to larger changes in simulated depth of field. Another solution is to base the simulation of depth of field, at least in part, on what the pupil size of the viewer would be expected to be if the scene currently represented by the rendered image were a real scene.

Accordingly, apparent brightness is an estimate of how bright a displayed image would be if it were viewed naturally (as a real scene) rather than on a screen, which can differs from the actual physical brightness of the image significantly due (for example) to technological limitations on the range of brightness that can be achieved by a display while remaining as an engaging image for the viewer to look at. This is demonstrated by the fact that images representing a sunny day and a rainy day may have similar levels of brightness when displayed on a television or an HMD display screen, with the distinguishing attributes (that is, attributes which convey the sense of brightness of the scene to the viewer) often being the colour palette or range of brightness used. For example, an image of a rainy day will be composed mainly of shades of grey, with a low range of brightness throughout the image (that is to say, with a low difference in brightness between the brightest part of the image and the least bright, which is to say, a low image contrast, for example being indicated by a contrast level below a threshold level), whereas an image of a sunny day could show dark shadows with light blue sky and the sun—giving a far greater range of brightness (between the brightest parts of the images and the least bright, that is to say, a higher contrast, for example, above a threshold level) and a far greater range of colour.

The "apparent" brightness of a rendered image, which is to say, an estimate of the equivalent brightness of a corresponding real scene, can in some examples be detected by a detection of image contrast or by the detection of image features or items present in the image. It can be useful in estimating an expected depth of field (and therefore a depth of field to be simulated), because as discussed above the brightness of a real scene should impact the depth of field due to variation in the size of the pupil. Therefore if the experienced depth of field for a given apparent brightness does not correspond to the expected depth of field associated with that brightness, then the viewer will not feel that the image is sufficiently realistic.

In the following description, techniques will first be described for implementing the simulated depth of field in a rendered image. Then, techniques for deriving an expected depth of field (to be simulated in a rendered image) will then be discussed.

Implementation of a Simulated Depth of Field

A rendered image is prepared (for example) by a process of assembling representations of different portions of the image in a render buffer to form the complete image. In order to do this, each image portion has an associated depth (distance from the viewpoint) attribute, with respect to a current viewpoint. (The depth attribute may refer to perpendicular rather than radial distance from the viewpoint, but the two closely approximate one another and so the depth attribute will be treated as at least a strong and useable approximation of the radial distance from the viewpoint in the following discussion). Assembling the image generally starts in a reverse depth order, which is to say with the furthest-away (greatest depth) portions first, followed by the next-furthest-away portions, and so on. One reason for handling the image rendering in this manner is that occlusions are then handled correctly, which is to say that a nearer object will block the view of a further-away object if it comes between the viewpoint and the further-away object.

To implement a simulation of an expected depth of field in an image, the depth attribute of a current point of focus is estimated or derived, and also a technique is used to make rendered objects having a depth attribute different to that of the current point of focus appear to be unfocused, in dependence upon the difference in depth from the point of focus and the extent of the currently simulated (expected) depth of field.

The derivation or estimation of the expected depth of field, and of the current point of focus, will be discussed below. First, a technique for making other portions of the image (having a depth attribute different to that of the point of focus) appear unfocused will be discussed.

Applying Blur to Portions of the Rendered Image

In the present example, a so-called blurring function may be applied to the image, either before the individual image features are assembled in the render buffer, or after they have been assembled in the render buffer. This is a function that is generated in response to a number of variables (such as the expected depth of field and point of focus), and it is used to apply a degree of blurring to parts of the image to be viewed that corresponds to the expected depth of field. For example, a small region either side of a determined point of focus may be left un-blurred whilst a steadily increasing blur is applied to regions outside of this with increasing depth separation from the point of focus. Example functions will now be discussed with reference to FIGS. 13-15.

Figure 13:
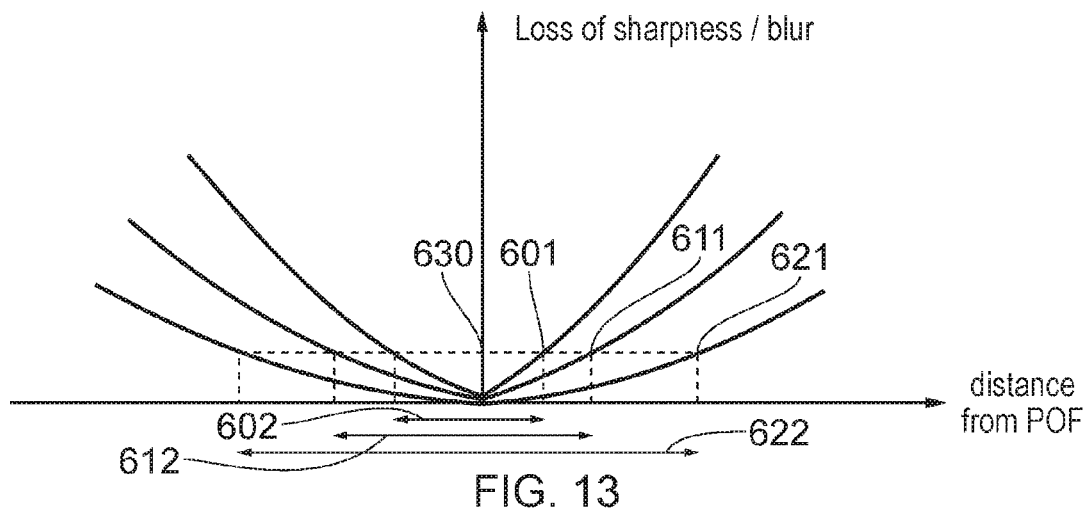
FIG. 13 schematically illustrates blurring functions with varying depth of field.

FIG. 13 shows a range of curves representing different depths of field for possible blurring functions that could be applied to a scene. The graph shows increasing blurriness (equivalent to the loss of sharpness) on the vertical axis with depth separation from the point of focus on the horizontal axis. The horizontal axis can represent depth separation on an absolute scale, but in some embodiments in which the degree of blurring increases with (or in other words depends upon) apparent depth separation relative to the point of focus in the image, the horizontal axis can represent depth separation as a proportion of the depth associated with the point of focus.

Curves 600, 610 and 620 correspond to shrinking aperture sizes (and therefore increasingly large depths of field, see FIGS. 11a and 11b). As described above, the edges of the depth of field region are defined by the limit of acceptable blurriness, which in the graph is determined to be at the level of the line 630. As can be seen from intersections 601, 611 and 621 the limit of acceptable blurriness occurs at a different depth separation for each curve 600, 610 and 620. This corresponds to a variety of depths of field for the system, corresponding to 602, 612 and 622 for the respective curves 600, 610 and 620.

Figure 14:
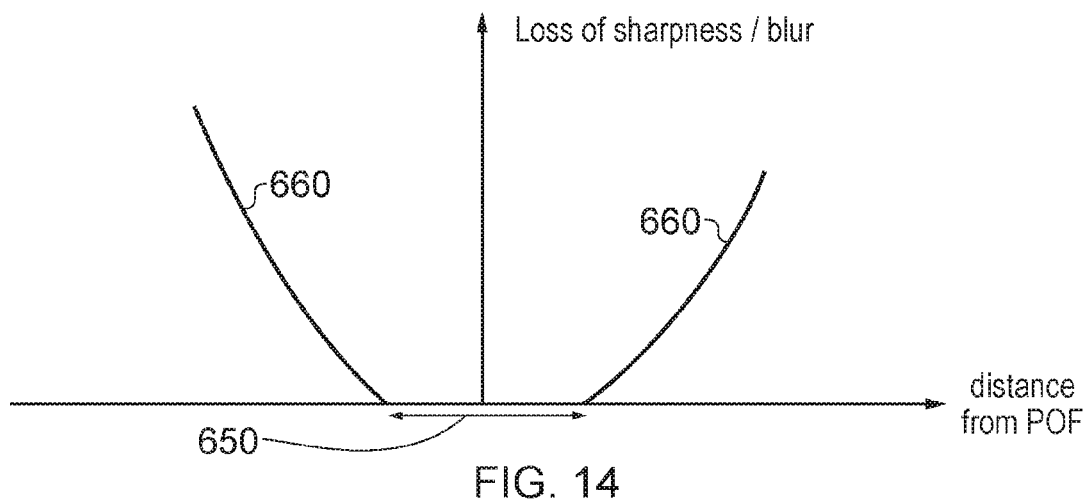
FIG. 14 schematically illustrates a blurring function.

The blurring function as pictured in FIG. 14 is an example of a function that could be implemented to simulate this effect in a rendered environment. In this example, no blurring is applied in a depth of field region 650 (that is, the acceptable degree of blurriness is considered to not be worth simulating, as it is generally close to being well focussed). Outside of this region, a blurring function represented by a curve 660 is applied in which the blurring increases with increasing depth separation from the depth of field region 650.

Figure 15:
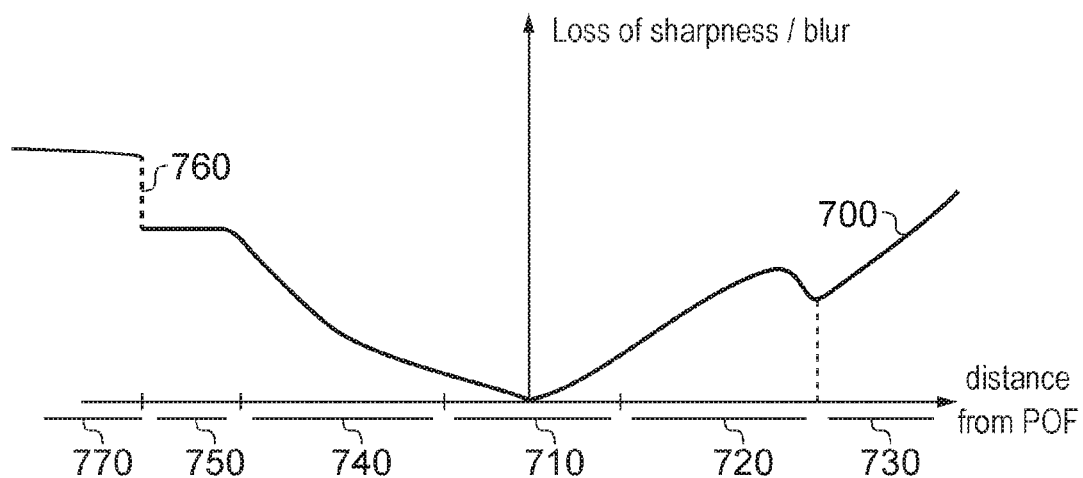
FIG. 15 schematically illustrates features of an example blurring function.

FIG. 15 shows a curve 700 representing several examples of features that may be present in a blurring function applied to an image. Initially, blurriness is applied equally either side of the point of focus (the intersection of the axes) in the region 710. The curve 700 then becomes asymmetric (a common feature, as depth of field is known to be greater one side of the point of focus than the other in many situations) outside of the region 710.

To the right of the vertical axis (corresponding to a greater apparent depth than the point of focus) there is a local decrease in blurriness in the region 720, which could be used in a game to represent an area or object of importance for example. The curve then continues with a region of increasing blurriness with increasing depth separation, with the additional degree of blurring that is applied decreasing with distance; this then results in the level of blurriness becoming effectively uniform at a large depth separation.

To the left of the vertical axis (corresponding to a lesser apparent depth than the point of focus) the curve continues in much the same fashion in the region 740 as it began in 710. The curve then plateaus in the region 750, corresponding to a region of constant blurriness over a range of apparent depth, before a step 760 in the function is introduced. A second, higher plateau corresponding to a second region of constant (but greater) blurriness is then seen in the region 770.

These features may all be incorporated into a blurring function in order to produce a depth of field simulation that generates blurriness to correspond to the expected view of a person, whilst still allowing features such as plateaus and local decreases in blurriness to be used to enhance gameplay or reduce the amount of processing required for example. An example of applying such a function in gameplay is to highlight a significant feature by enhancing its clarity within a predominantly blurry surrounding region, thus making it stand out to a player. The amount of processing may also be reduced in the scenario in which a uniform blurring function (rather than a function that varies with depth) is applied to regions a set depth separation outside of the depth of field region for example, thus reducing the number of convolution kernels that must be generated as described below.

The blurring function describes the 'amount' of blurring to apply, and this blurring can be applied using any appropriate method, two examples of which are now described.

Gaussian blur is a common method used to apply blur to images by using a Gaussian function to produce a weighting function in order to generate new values for pixels based upon the value of the pixels about them. This reassigning of pixel values based upon the values of surrounding pixels generates a blurrier image by reducing the variation between neighbouring pixels. A general two-dimensional Gaussian function is:

$$G(x, y) = \frac{1}{2\pi\sigma^2} e^{-\frac{x^2+y^2}{2\sigma^2}}$$

where $\sigma$ is the standard deviation of the Gaussian function (representing the amount or degree of blur to be applied in the present example) and x and y are horizontal and vertical separations from the origin (the point about which blurring is applied). This function generates sets of concentric circles of equal value about a point, the values of which are used as weightings when assigning a new value to pixels. The distribution that is generated is used to build a kernel (also known as a convolution matrix) which is applied to the original image, the result of which is a weighted averaging of a pixel's value depending on neighbouring pixels.

The kernel that is generated describes a convolution such that a pixel's original value has the highest weighting and the weighting of nearby pixel values decreases with distance from the pixel the blurring is being applied to. The weighting (and thus the degree of blurriness that is applied) may be varied by changing the value of $\sigma$, as a small value of $\sigma$ produces a narrower, taller Gaussian distribution which results in the pixel to which the blurring is applied remaining largely unchanged because the weighting of surrounding pixels is much lower in comparison; this corresponds to a small degree of blurring. Varying $\sigma$ in the opposite direction, a larger value of $\sigma$ will result in a broader distribution in which the pixel value weighting decreases more slowly with distance from the original pixel; this translates to a greater degree of blurring than the smaller value of $\sigma$.

Relating this to a generated blurring function, it is apparent that a Gaussian blur could be applied to image elements at each depth with a varying $\sigma$ value. For example, in FIG. 13 each of the points 601, 611 and 621 would correspond to the same $\sigma$ value (as they display the same degree of blurring) and moving closer to the y-axis on the graph means a smaller degree of blurring is applied (and thus a smaller value of $\sigma$ is used). Moving to the right of the respective points 601, 611, 621 corresponds to a greater degree of blurring and thus a larger value of $\sigma$ is used in the generation of the Gaussian distribution and the resulting kernel.

FIGS. 13 and 14 provide examples of the degree of blurring increasing monotonically with apparent depth separation relative to the point of focus in the image.

A second method of blurring that could be used is bokeh emulation. Bokeh is defined as the way out-of-focus elements are blurred in an image taken by a real camera. This is largely dependent on optical properties such as lens aberrations and aperture shape, some combinations of which may result in a more visually pleasing blur than others.

Bokeh emulation is applied by generating a kernel which corresponds to an out-of-focus image taken with a real camera, rather than the purely algorithmic approach of Gaussian blur. The kernels applied in the emulation take into account the distance of each element in the image from the viewpoint, as well as elements that are occluded by foreground objects. The kernel is convoluted with the original image to apply the blur, which generates uniform shapes (corresponding to the aperture shape) about each out of focus point.

This method of emulation is more computationally intensive than Gaussian blurring, but produces a sharper distinction between objects that are out of focus as the same process of averaging pixel values is not implemented. An example of how this method can be used in conjunction with a blurring function is now described.

An image taken with a camera can be used to generate a kernel which is then applied to a generated image with knowledge about the apparent distance of generated objects in the image from the desired viewpoint. The kernel could also be adjusted (or changed to correspond to that of another camera) for different regions in the image in order to generate the effects discussed with regards to FIG. 15 for example.

Applying Blur to Externally Supplied or Captured Images

Applying blur to externally supplied images, such as a captured image (such as a photograph) or an image that is rendered elsewhere (or without the processing device being able to modify it to include blur), may be more difficult to implement than when the blur can be applied during rendering, or indeed unnecessary if a depth of field is already present.

With captured images, there may already be an apparent depth of field due to the optical properties of the camera that is used to capture the image. Although some modification of the blurring may be desired, for example to sharpen objects of interest in the scene that are out of focus, this is likely to have been taken into account when capturing the image and thus the addition or removal of blurring may be unnecessary.

One method of deriving the correct degree of blurring to apply a supplied image is the case in which apparent depth information for respective image regions is provided via associated metadata. Each object in the image (which may be captured or otherwise rendered without depth of field simulation already applied) may therefore be described in the metadata with an apparent depth in addition to a point of focus being defined (although it may be determined in other ways, as later described). The appropriate blurring function can then be applied correctly at each apparent depth relative to the point of focus, resulting in the desired depth of field simulation.

If it is a 3D image that is supplied, then the apparent depth information can be estimated by comparison of complementary stereoscopic frames to derive the image disparity (the distance between the same object in the left and right frames) for example. Once the depth information has been derived, the blurring function can be applied to the image as in the cases in which it is applied during the rendering of the image.

A further method of applying blur to a captured image relates to the use of so-called light field photography, for example as discussed in the technical paper "Light Field Photography with a Hand-held Plenoptic Camera", Ng et al, Stanford Tech Report CTSR 2005-02, the content of which is hereby incorporated by reference. This technique makes use of a camera which samples the so-called "4 light field" in a single photographic exposure, by (in the example in this paper) imposing a micro lens array between an image sensor and a main lens. The technique allows a computational process to be used as an after-process (that is to say, after the image exposure has been captured) to change the point of focus and the depth of field in the captured image. In this way, the depth of field selected for use with the computational process has the effect of applying blurring to parts of the image but not to others (or in different degrees to different portions of the image), or in other words of applying a varying blurring function.

Applying this technique to the present embodiments involves capturing an image using such a light field camera, and then (as a simulation of depth of field in response to the techniques discussed here) using a computational process on the captured image to simulate the required point of focus and/or depth of field. In other words, such a computational process could use as an input parameter the depth of field simulation parameters discussed in connection with FIGS. 13-15, but applying the computational process discussed above as a form of a blurring function.

The various techniques discussed here are examples of generating the image for display by the display device by applying a blurring function to simulate the expected depth of field of the image, wherein the blurring function applies blurring as a function of apparent spatial depth within the image, the blurring function being such that the degree of blurring applied to a depth region which is closer, in an apparent depth direction, to the point of focus is lower than the degree of blurring applied to a depth region which is further, in an apparent depth direction, from the point of focus, and the variation of the blurring function with respect to depth separation from the point of focus depends upon the expected depth of field.

Estimation or Derivation of Point of Focus

In order to apply a blurring function to an image to simulate a depth of field, the point of focus in the image must also be derived as a reference point about which to apply the blurring. There are several methods by which this could be achieved, some examples of which are described with reference to FIGS. 16-18.

A first example relates to an estimation from a detection of the physical direction in which the eyes are pointing, or in other words, by a so-called gaze detection technique. This type of estimation involves detecting, using one or more cameras directed towards a viewer's eyes, the orientation of one or both of the viewer's eyes; and detecting the point of focus from the detected orientation of the viewer's eye or eyes.

Figure 16:
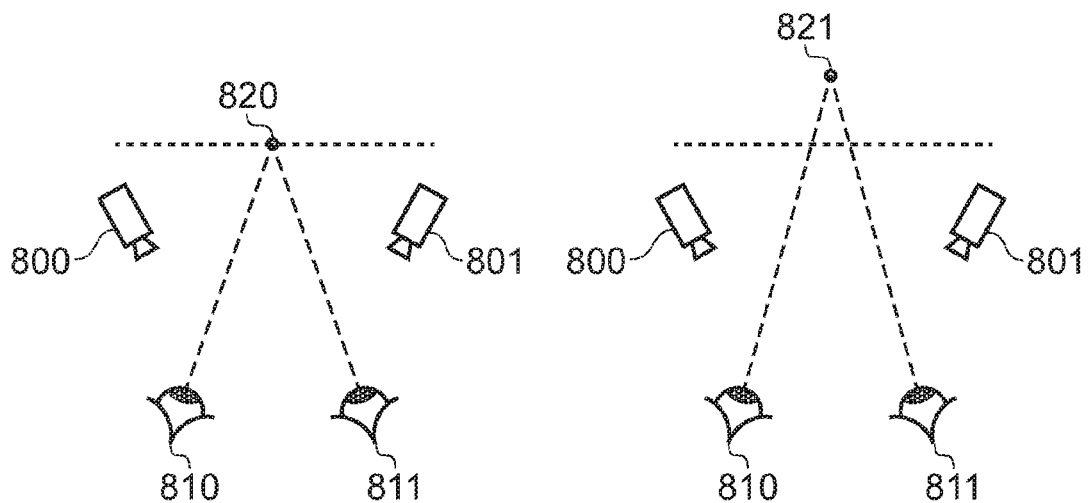
FIG. 16 schematically illustrates determining a point of focus using vergence of the eyes.

FIG. 16 shows two cameras 800 and 801 that are used to detect the orientation of the eyes 810 and 811 in a head mountable display device. By comparing information about the orientation of each eye 810/811, the so-called vergence (relative angle) of the eyes can be detected. The vergence can then be used to detect where on the display screen 820 (or with respect to a virtual image of a display, as in an HMD) the viewer is looking, and at which apparent depth the viewer is focussed on in the case of a 3D image. Alternatively, the orientation of just one of the eyes 810 and 811 can be used to determine a line of sight along which the user is focussed and then by comparing this with information about which objects appear in this line (for example, game characters or just scenery) the viewed object and thus depth of focus can then be predicted. This is an example of detecting an image region at which the viewer's eyes are directed; and detecting the apparent depth in the image of that image region, and in particular an example of detecting the vergence of the viewer's eyes; and detecting a viewing depth corresponding to the detected vergence. In this way, in at least some examples, the real (physical) vergence is used to detect where the viewer is looking, and this information is used in turn to generate a simulation of the depth of field that the user would experience around the currently viewed position.

Figure 17:
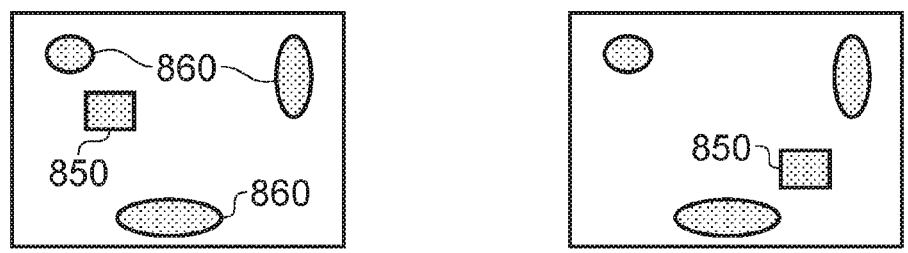
FIG. 17 schematically illustrates a most displaced interframe element.

A second method that may be used is illustrated in FIG. 17. This comprises the detection of image elements that move by the greatest amount between frames of a video or rendered image sequence. This is because in such a sequence, a part of the image that moves by a large amount is often the most important part as a large movement may signify important action. This detection of a significant element of the image can then be combined with information about the depth of different objects carried in associated metadata, or estimated by processing of the image for example. In FIG. 17, two frames of a sequence are shown ('Frame 1' and 'Frame 2') which contain stationary or near-stationary objects 860 as well as an object 850. The object 850 clearly undergoes a large translation relative to the other objects 860, and as a result is designated as a most significant feature in the sequence and therefore it is assumed to be at a depth corresponding to the point of focus of the viewer. This is an example of detecting image motion between successive images; detecting, as a point of focus, an image region having the greatest inter-image motion; and detecting the apparent depth in the image of that image region (for example by detecting a lateral disparity at that image region in a pair of stereoscopic images or by detecting metadata associated with the image indicative of image depth of respective regions of the image).

FIG. 18 illustrates an example of a third method, which is the predetermining of a "most significant" feature such that the most significant feature may be designated by a game designer and the information denoting this is provided in associated metadata for example. For instance, a main character in a game could be defined as being the most significant feature for a sequence of the game. This is illustrated in FIG. 18 where an image contains background objects 910 that are recognised as being insignificant (by virtue of not being a most significant feature) alongside an object or character 900 upon which the image is focussed. In a game, the rendering process can incorporate supplied data (such as metadata) about the apparent depth of different objects and as a result the point of focus can be easily defined for an object and the blurring function can be determined about this point according to any of the methods described.

The second and third methods discussed above provide examples of detecting the point of focus as a location, in the image, of a most significant feature of the image or in image model data from which the image is derived. For example, in a situation in which the image is an image representing gameplay of a video game, the most significant feature of the image model data may represent a game character.

The methods described for detecting the point of focus do not generally calculate the apparent depth of the point of focus (with the exception of the vergence method), and if the information is not provided in the form of associated metadata then it is useful to be able to calculate it. One possible method of doing so is illustrated in FIG. 19, which shows two complementary left and right eye stereoscopic images (L and R). By measuring the lateral disparity between the two images, that is, the apparent translation of an identical or substantially identical image element between the two time-matched images, the apparent depth can be derived. In the Figure, an object 950 can be seen to have a lateral disparity between the images corresponding to the distance 960, representing the lateral separation of the object 950 in the two images (the image position in the right eye image which corresponds to the image position of the object 950 in the left eye image is shown—purely for the purposes of illustrating the lateral disparity—as an image position 955). This provides an example of detecting the apparent depth of the image region comprises detecting the lateral disparity between representations of that image region in a pair of coupled stereoscopic images. This distance 960 can then be mapped to a corresponding apparent depth based upon its magnitude, where a greater magnitude of lateral disparity indicates a lesser apparent depth for an object of known size.

Deriving or Estimating an Expected Depth of Field

As discussed above, the derivation or estimation of an expected field in these examples can be with respect to one or both of the current actual physical pupil size for a viewer and/or an estimation of what the pupil size would be for an equivalent real scene, based upon a detection of properties such as the "apparent" brightness of an image.

Detecting the apparent brightness of an image can be achieved in a variety of ways, two of which will be described with reference to FIGS. 20*a*, 20*b* and 21. These techniques provide examples of deriving an expected depth of field for an image for display by the display device, with respect to a point of focus in the image, in response to lighting conditions of the environment represented by the image, such that a greater expected depth of field is associated with an image representing an environment having lighting conditions with a greater apparent brightness. The technique may involve detecting the apparent brightness of the image for display from one or more selected from the list consisting of:

(i) metadata associated with the image indicating apparent brightness data;

(ii) data defining simulated lighting used for rendering the image;

(iii) colour and/or luminance properties of the image; and (iv) a detection of the presence of particular characteristic image features in the image (such as a sun in a blue sky, for example).

A first method that could be used is analysis of the colour and/or luminance properties of an image to be displayed, such as a rendered scene from a game. Although the actual display brightness of scenes may be relatively normalised (due to the small range of brightness that most screens can display in comparison to the range applicable to a real scene), an analysis of the luminance of the image may be undertaken. Other features may also be indicative of apparent brightness too, such as colour and/or contrast (as discussed earlier, with the example that an image of a rainy day is composed mostly of shades of grey and therefore it could be inferred from this that the level of brightness in the image will generally be low).

FIG. 20*a* illustrates a rainy day image, which is not only a dark image but also can be seen to have a small range of colours—the image mostly consists of a grey cloud with a grey sky as a background. However, FIG. 20*b* shows a sunny day which is much lighter. There is also a greater range of colours (the sun, a blue sky, a green tree etc . . . ) and a greater range of brightness in the image (for example, bright sky and dark shadows). Therefore, the range of brightness and variety of colours can be used in addition to absolute display brightness to determine the correct apparent brightness of an image. Similarly (as well or instead) the contrast in the image of FIG. 20*a* can be detected to be lower than the contrast in the image of FIG. 20*b*.

Figure 21:
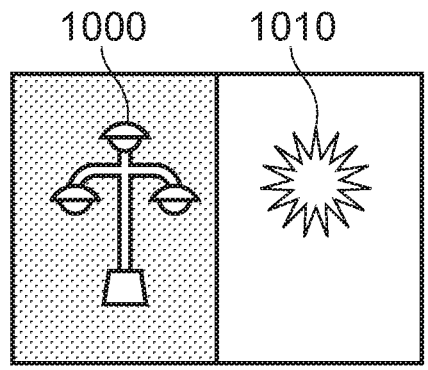
FIG. 21 schematically illustrates examples of simulated lighting that has been rendered.

FIG. 21 instead shows two examples of rendered lighting in a game. The light sources 1000 and 1010 (a streetlight and a sun for example) may be identified by associated metadata or otherwise (for example, by image analysis). For example, a streetlight 1000 could be identified as having a particular apparent brightness, or simply as a type of simulated lighting that is only used at night (therefore only when the apparent brightness of the scene is low). In the case of a rendered image, the apparent brightness information for the whole image may be described by simulated light information generated during rendering. This allows for a differentiation between this and the alternative light source 1010 which could be associated with a generally bright environment (for example, a sunny day) and therefore the apparent brightness of the generated image can be inferred.

A second example of a method of deriving the apparent brightness of an image is to use individual pixel information. For example, a sample could be selected (which may be the whole image) and analysed to determine apparent brightness. One method by which this could be achieved is in the YCbCr colour space which describes each pixel with a luma component and blue-difference and red-difference chroma components. The apparent brightness of the image could then be estimated by an averaging of the luma (Y) component over a sample area and relating this to an apparent brightness in which a larger Y component would generally correspond to a greater apparent brightness for an image. A similar approach can also be taken with the RGB colour space, either by using a conversion formula to determine the corresponding Y component to represent the pixel and then using the same relationship as for the YCbCr colour space, or by some other derived relationship between the RGB value and brightness.

Detecting the actual (physical) pupil diameter is a technique that can be used to estimate the expected apparent depth of field when the processing is used in conjunction with a head mountable display unit that has one or more eye-facing cameras for example. This is an example of detecting a pupil diameter of the viewer; and applying a deriving step comprising deriving the expected depth of field in dependence upon the detected pupil diameter such that the expected depth of field is larger for a smaller detected pupil diameter.

The detection of pupil diameter can be carried out as an alternative to the other techniques discussed here (such as detecting apparent brightness), or the two can be carried out in respect of the same image, for example so that the expected depth of field can be derived as a weighted average (for example, a 50:50 average, though other weightings can be used) based on the two detections. The techniques discussed here for detecting the point of focus are applicable to either or both of the depth of field derivations discussed here.

This technique is useful when used with a consideration of a relationship between real brightness and pupil diameter when viewing a real scene, as this can be linked to an observed depth of field and therefore an expected depth of field in the displayed image. As described earlier with reference to FIGS. 11a and 11b, a greater pupil diameter is linked to a smaller depth of field than a smaller pupil diameter and as such the blurring function can be determined in response to the expected depth of field, which in turn depends on the detected diameter as well as other factors.

Figure 22:
FIG. 22 schematically illustrates a pupil diameter measuring method.
Figure 23:
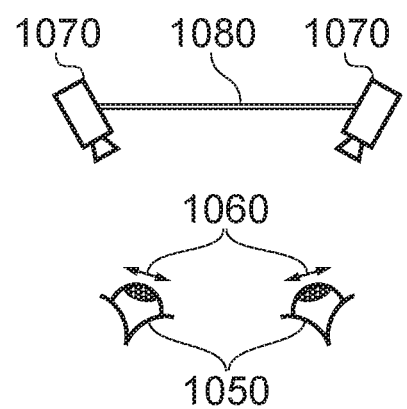
FIG. 23 schematically illustrates an HMD with a pair of cameras.

A schematic view of such a device is shown in FIG. 22, in which a camera 1070 is used to view an eye 1050 of a viewer and detect the pupil diameter 1060. FIG. 23 schematically illustrates an example of two cameras 1070 attached to a frame 1080, each camera 1070 aligned to measure the pupil of a respective eye (the closest eye to each camera) 1050. The result of each pupil diameter 1060 measurement can either be used separately (although both would generally be expected to be the same for most viewers, so the present technique could operate with a detection in respect of only one pupil) or used to compute an average measurement between the two. The frame 1080 may be a frame or part of a frame of an HMD.

Figures 24, 25, 26:
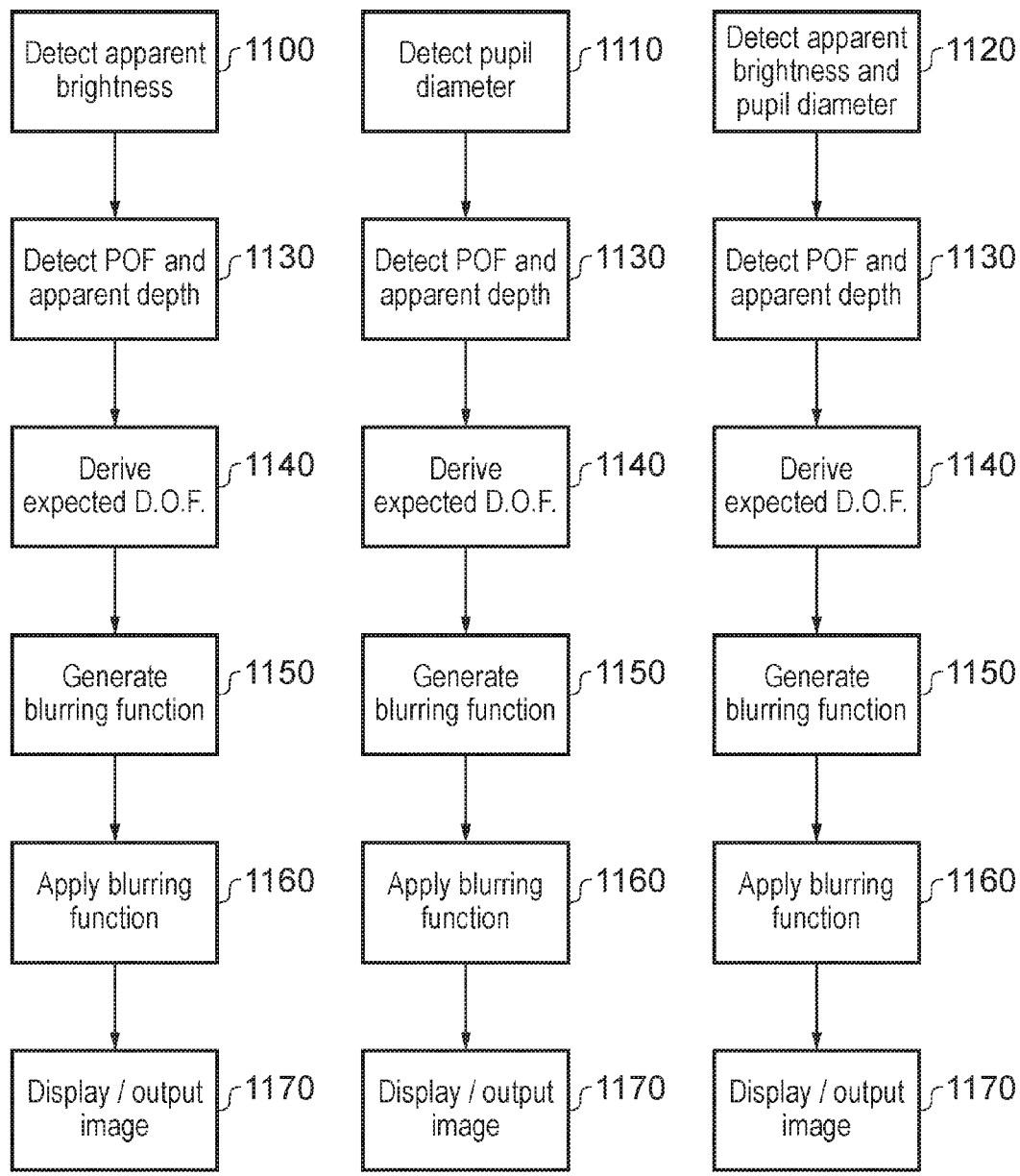
FIG. 24 is a schematic flowchart of a method using detected apparent brightness.
FIG. 25 is a schematic flowchart of a method using measured pupil diameter.
FIG. 26 is a schematic flowchart of a method using both detected apparent brightness and measured pupil diameter.

FIG. 24 is a schematic flowchart that illustrates one implementation of a depth of field simulation method in response to a detected apparent brightness. In a step 1100 the apparent brightness of the image to be displayed is derived in accordance with the earlier description of the method. In a next step 1130, the point of focus and its apparent depth are both determined, and the expected depth of field for the viewer is calculated using these inputs in a next step 1140. Once the expected depth of field has been calculated in the step 1140, a blurring function to simulate this is generated in a step 1150 and then applied to the image to be displayed in a step 1160. The step 1160 may also comprise rendering a new image with the blurring function as an input, for example in the generation of frames for a video game. In a final step 1170, the processed image is displayed at the display device.

FIG. 25 is a schematic flowchart that illustrates one implementation of a depth of field simulation method in response to a measured pupil diameter of a viewer using an HMD device. In a first step 1110, the pupil diameter is measured in accordance with the method described above using cameras mounted on the frame of the HMD device. In a next step 1130, the point of focus and its apparent depth are both determined, and the expected depth of field for the viewer is calculated using these inputs in a next step 1140. Once the expected depth of field has been calculated in the step 1140, a blurring function to simulate this is generated in a step 1150 and then applied to the image to be displayed in a step 1160. The step 1160 may also comprise rendering a new image with the blurring function as an input, for example in the generation of frames for a video game. In a final step 1170, the processed image is displayed at the HMD device.

FIG. 26 is a schematic flowchart that illustrates one implementation of a depth of field simulation method that incorporates both apparent brightness detection as well as pupil diameter measurement. In a first step 1120, the pupil diameter is measured in accordance with the method described above using one or more cameras mounted on the frame of the HMD device and the apparent brightness of the image to be displayed is also detected as described above. In a next step 1130, the point of focus and its apparent depth are both determined, and the expected depth of field for the viewer is calculated using these inputs in a next step 1140. Once the expected depth of field has been calculated in the step 1140, a blurring function to simulate this is generated in a step 1150 and then applied to the image to be displayed in a step 1160. The step 1160 may also comprise rendering a new image with the blurring function as an input, for example in the generation of frames for a video game. In a final step 1170, the processed image is displayed at the HMD device.

Next, the techniques shall be described with reference to example hardware or software-controlled hardware arrangements. It will be appreciated that such hardware may be a computer. It will be appreciated that the software may be provided by various providing media, such as a non-transitory machine-readable storage medium which stores computer software which, when executed by a computer, causes the computer to perform any of the methods described here.

FIGS. 27-34 provide examples of image processing apparatus (in some instances, including a display so as to form a display apparatus) to carry out the various methods discussed above. The apparatus may be implemented as a computer games machine or apparatus.

Figure 27:
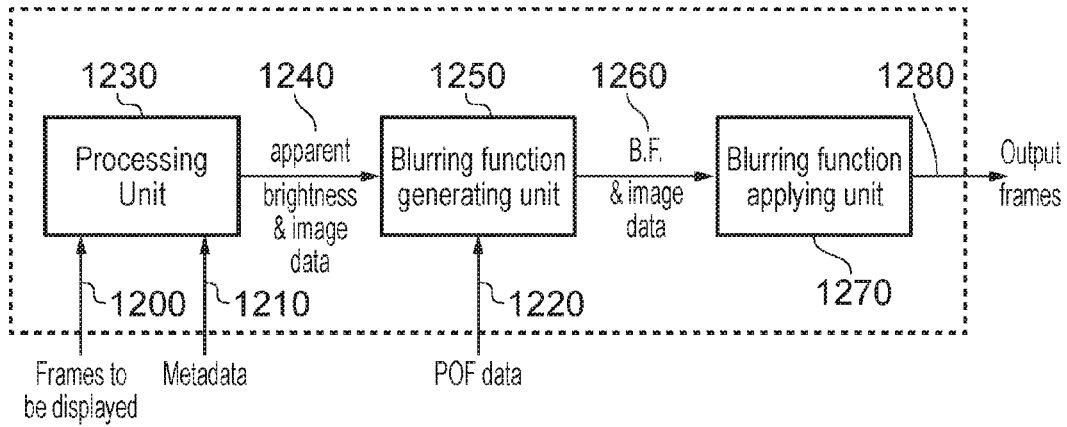
FIG. 27 schematically illustrates video processing hardware.

FIG. 27 schematically illustrates hardware operable to apply a blurring function to a video or sequence of frames from a game in response to a detected apparent brightness. Input to the processing unit 1230 are the frames to be displayed 1200 and the associated metadata 1210 for the frames. The processing unit 1230 then generates apparent brightness data 1240 which is used along with the point of focus data 1220 (if it is not included in the metadata 1210) by the blurring function generating unit 1250 to generate the blurring function 1260. The blurring function 1260 is then applied by the blurring function applying unit 1270 to produce processed images 1280.

Figure 28:
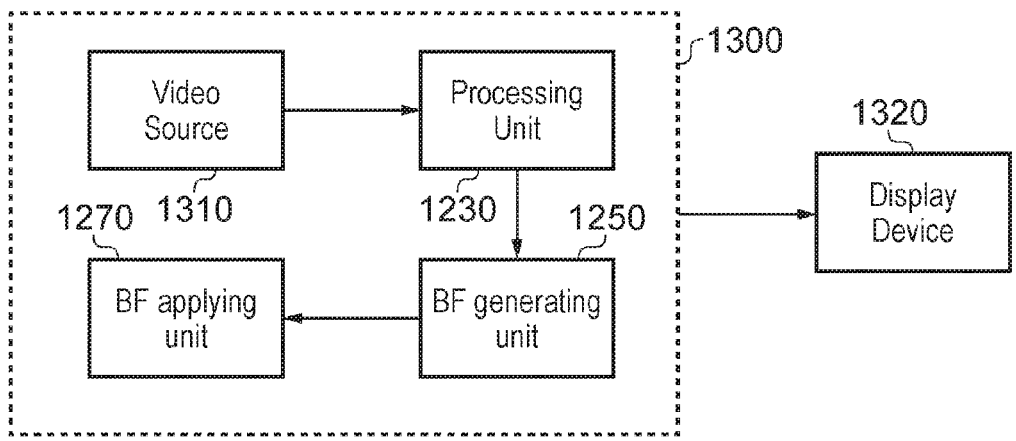
FIG. 28 schematically illustrates video processing hardware with a display device.
Figure 29:
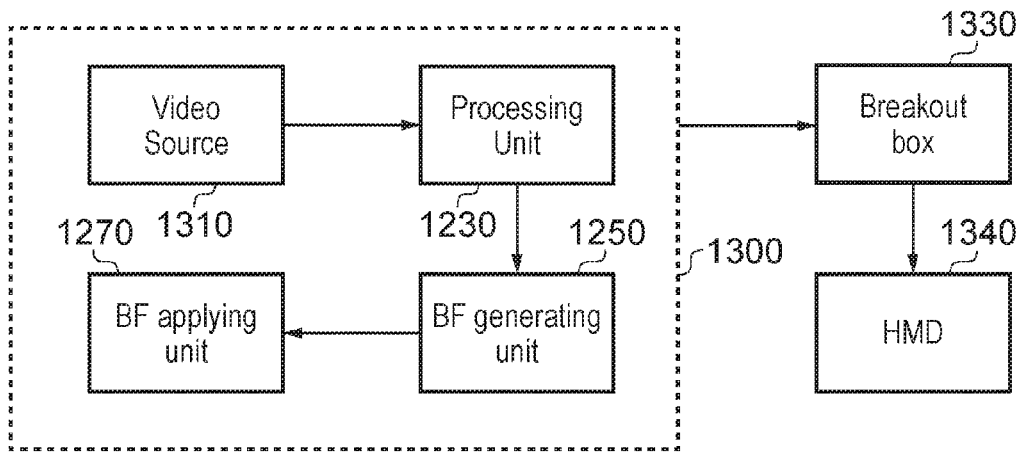
FIG. 29 schematically illustrates video processing hardware with an HMD.

FIG. 28 schematically shows the processing unit 1230, blurring function generating unit 1250 and blurring function applying unit housed in a device 1300 with a video source 1310, the video source 1310 comprising an optical disk drive, a hard drive or a network connection as examples of hardware capable of obtaining the image data required. The processed frames 1280 are then output to the display device 1320 (for example, a television screen). FIG. 29 shows a similar arrangement, with the display device instead being a breakout box 1330 and a head mountable display device 1340.

Figure 30:
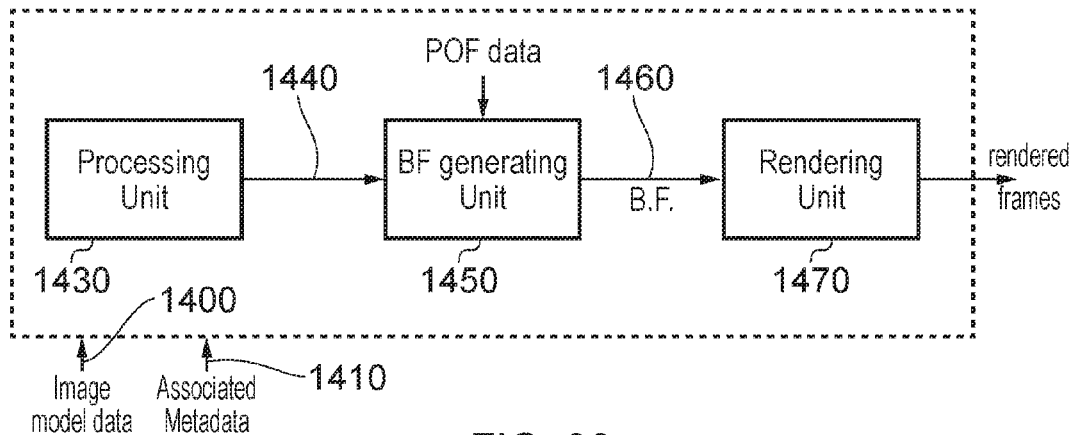
FIG. 30 schematically illustrates video rendering hardware.

FIG. 30 schematically illustrates a video rendering hardware operable to generate rendered frames in response to apparent brightness information. Image model data 1400 and any associated metadata 1410 are provided to the processing unit 1430 to generate apparent brightness information 1440. This is input into the blurring function generating unit 1450 with the point of focus data 1420 (if it is not provided by the metadata 1410) in order to generate the blurring function 1460. The rendering unit 1470 then uses the blurring function 1460 in conjunction with the image model data 1400 to produce rendered frames 1480 for display.

Figure 31:
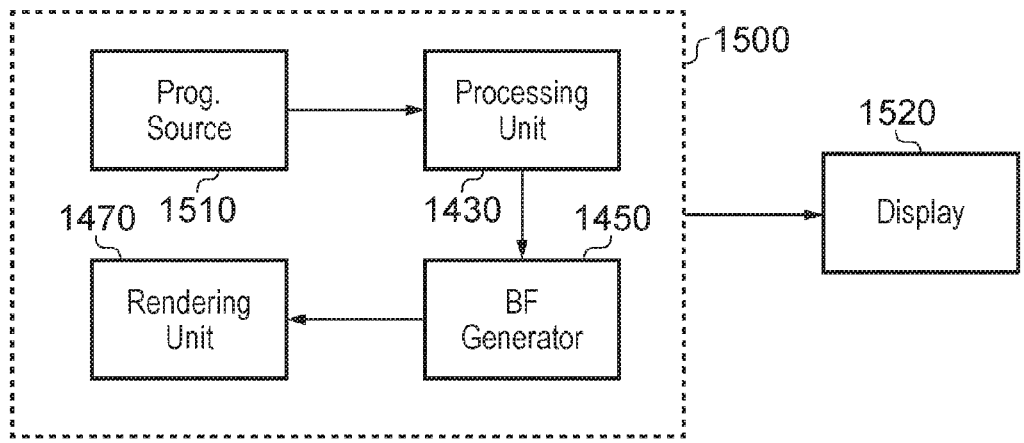
FIG. 31 schematically illustrates video rendering hardware with a display device.
Figure 32:
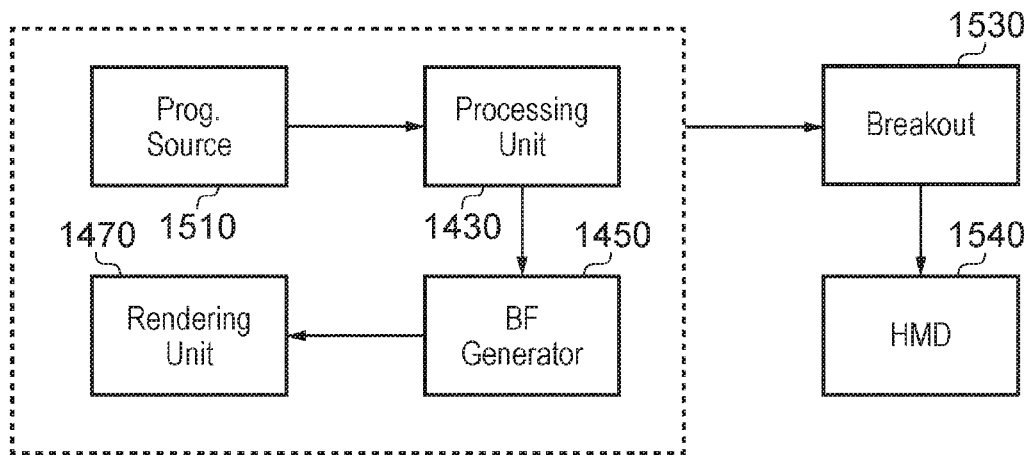
FIG. 32 schematically illustrates video rendering hardware with an HMD.

FIG. 31 shows a games console or other application processing device 1500 that houses the processing unit 1430, blurring function generating unit 1450 and rendering unit 1470 alongside a program source 1510 which may be embodied by any of the devices discussed above with reference to the video source 1310 of FIG. 28. The device 1500 is then connected to a display device 1520. In FIG. 32, the same device 1500 is instead used in conjunction with a breakout box 1530 and head mountable display device 1540.

Figure 33:
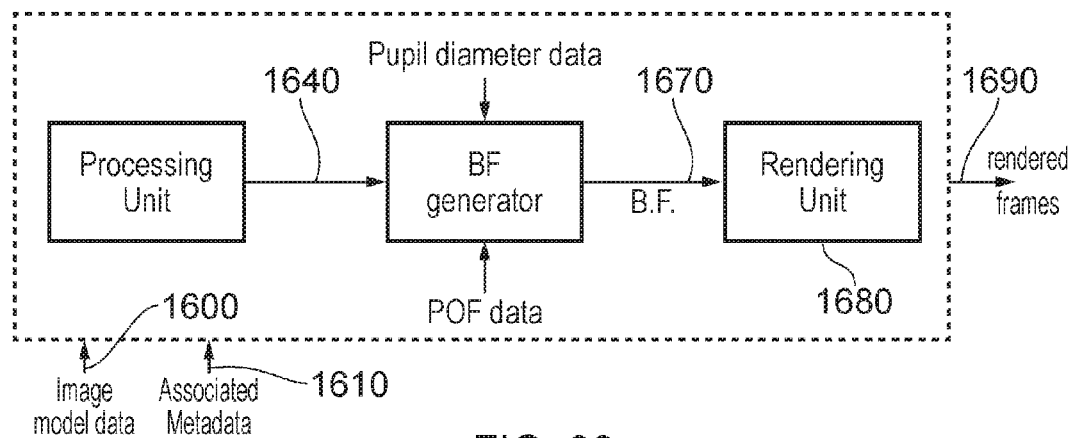
FIG. 33 schematically illustrates video rendering hardware.

FIG. 33 schematically illustrates hardware operable to render frames in response to both a measured apparent brightness and a measured pupil diameter; however it should be understood that the apparent brightness detection could be omitted in the present embodiment and the device could rely only on pupil diameter information. It should also be understood that the blurring function as generated in this embodiment could instead be applied to already generated images, such as a video as in FIGS. 27-29, rather than being used to render new images.

In FIG. 33, image model data 1600 and any associated metadata are supplied to a processing unit 1630 which generates apparent brightness data 1640. The blurring function generator then uses the apparent brightness data 1640 with point of focus data 1620 (which may be detected by a camera, or determined by other means) and pupil diameter data 1650 (measured by cameras, as discussed previously) to generate a blurring function 1670. This is then used by the rendering unit 1680 to produce rendered frames 1690 from the initial image model data 1600.

Figure 34:
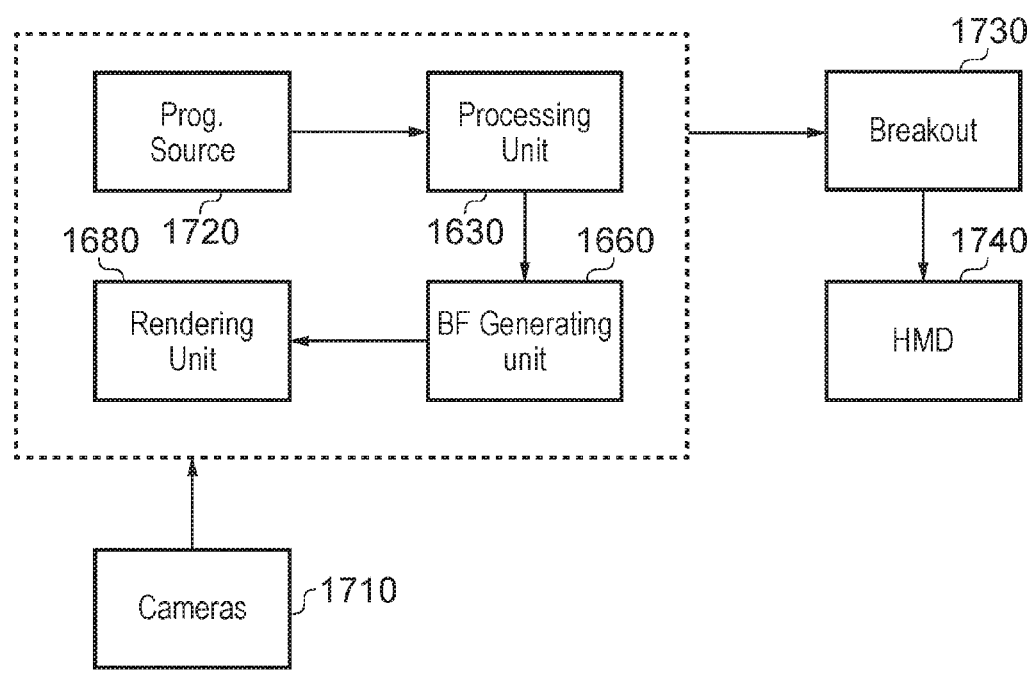
FIG. 34 schematically illustrates video rendering hardware with cameras and a display device.

FIG. 34 shows a hardware arrangement in which the processing unit 1630, blurring function generator 1660 and rendering unit 1680 are housed in a device 1700 (for example, a games console) along with a program source 1720 (which may be a video source if the blurring function is not used during rendering, but instead applied to an already generated image). Cameras 1710 provide pupil diameter data 1650 and in some embodiments point of focus data 1620 to the device 1700. The rendered images are supplied to a break out box 1730 and head mountable display device 1740, although in some embodiments a television screen or other alternative may be used.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be apparent that numerous modifications and variations of the present disclosure are possible in light of the above teachings. It is therefore to be understood that within the scope of the appended claims, the technology may be practiced otherwise than as specifically described herein.

We claim:

1. A method of generating an image for display by a display device, the method comprising:
deriving an expected depth of field for the image for display by the display device, the expected depth of field representing a depth distance with respect to a point of focus in the image between nearest and farthest objects which appear focused, in response to lighting conditions of an environment represented by the image, such that a greater expected depth of field is associated with a given image representing a particular environment having corresponding lighting conditions with a greater apparent brightness, wherein apparent brightness is an estimate of brightness of an equivalent real scene corresponding to a scene represented by an image for display; and
generating, by one or more processors, the image for display by the display device by applying a blurring function representing a loss of focus relative to the focus of the image at the point of focus to simulate the derived expected depth of field of the image, wherein the one or more processors apply blurring as a function of apparent spatial depth within the image by making rendered objects having a depth attribute different to that of a current point of focus appear to be unfocused, the blurring function being such that a degree of the blurring applied to a first depth region which is closer, in a first apparent depth direction, to the point of focus is lower than the degree of blurring applied to a second depth region which is further, in a second apparent depth direction, from the point of focus, and variation of the blurring function with respect to depth separation from the point of focus depends upon the expected depth of field.

2. A method according to claim 1, wherein the degree of blurring increases monotonically with apparent spatial depth separation relative to the point of focus in the image.

3. A method according to claim 1, wherein the variation of the blurring function with respect to depth separation depends upon the apparent spatial depth of the point of focus.

4. A method according to claim 1, further comprising:
detecting, using one or more cameras directed towards a viewer's eyes, an orientation of one or both of the viewer's eyes; and
detecting the point of focus from the detected orientation of one or both of the viewer's eyes.

5. A method according to claim 4, in which the step of detecting the point of focus comprises:
detecting an image region at which one or both of the viewer's eyes are directed; and
detecting the apparent spatial depth in the image of the detected image region.

6. A method according to claim 5, in which the step of detecting the apparent spatial depth of the image region comprises detecting a lateral disparity between representations of the image region in a pair of coupled stereoscopic images.

7. A method according to claim 5, in which the step of detecting the apparent spatial depth of the image region comprises detecting metadata associated with the image indicative of image depth of respective regions of the image.

8. A method according to claim 4, in which the step of detecting the point of focus comprises:
detecting a vergence of the viewer's eyes; and
detecting a viewing depth corresponding to the detected vergence.

9. A method according to claim 1, in which the generating step comprises rendering the image for display according to image model data.

10. A method according to claim 9, wherein:
the point of focus is detected as a location, in the image, of a most significant feature of the image model data.

11. A method according to claim 10, in which:
the image is an image representing gameplay of a video game; and
the most significant feature of the image model data represents a game character.

12. A method according to claim 1, wherein the point of focus is detected by:
detecting image motion between successive images;
detecting, as the point of focus, an image region having a greatest amount of inter-image motion; and
detecting the apparent spatial depth in the image of the image region having the greatest amount of inter-image motion.

13. A method according to claim 12, in which the step of detecting the apparent spatial depth of the image region having the greatest amount of inter-image motion comprises detecting a lateral disparity between representations of the image region having the greatest amount of inter-image motion in a pair of coupled stereoscopic images.

14. A method according to claim 12, in which the step of detecting the apparent spatial depth of the image region having the greatest amount of inter-image motion comprises detecting metadata associated with the image indicative of image depth of respective regions of the image.

15. A method according to claim 1, further comprising:
detecting a pupil diameter of a viewer;
and in which the deriving step comprises:
deriving the expected depth of field in dependence upon the detected pupil diameter such that the expected depth of field is larger for a smaller detected pupil diameter.

16. A method according to claim 1, further comprising detecting an apparent brightness of the image for display from one or more selected from the list consisting of:
(i) metadata associated with the image indicating apparent brightness data;
(ii) data defining simulated lighting used for rendering the image;
(iii) colour and/or luminance properties of the image; and
(iv) a detection of a presence of particular characteristic image features.

17. A method according to claim 1, further comprising displaying the image using the display device.

18. A non-transitory machine-readable storage medium having instructions stored thereon, the instructions, when executed by a computer, causing the computer to perform a method comprising:
deriving an expected depth of field for the image for display by the display device, the expected depth of field representing a depth distance with respect to a point of focus in the image between nearest and farthest objects which appear focused, in response to lighting conditions of an environment represented by the image, such that a greater expected depth of field is associated with a given image representing a particular environment having corresponding lighting conditions with a greater apparent brightness, wherein apparent brightness is an estimate of brightness of an equivalent real scene corresponding to a scene represented by an image for display; and
generating the image for display by the display device by applying a blurring function representing a loss of focus relative to the focus of the image at the point of focus to simulate the derived expected depth of field of the image, wherein the blurring is applied as a function of apparent spatial depth within the image by making rendered objects having a depth attribute different to that of a current point of focus appear to be unfocused, the blurring function being such that a degree of the blurring applied to a first depth region which is closer, in a first apparent depth direction, to the point of focus is lower than the degree of blurring applied to a second depth region which is further, in a second apparent depth direction, from the point of focus, and variation of the blurring function with respect to depth separation from the point of focus depends upon the expected depth of field.

19. An image processing apparatus configured to generate an image for display by a display device, the apparatus comprising:
a processor configured to derive an expected depth of field for the image for display by the display device, the expected depth of field representing a depth distance with respect to a point of focus in the image between nearest and farthest objects which appear focused, in response to lighting conditions of an environment represented by the image, such that a greater expected depth of field is associated with a given image representing a particular environment having corresponding lighting conditions with a greater apparent brightness, wherein apparent brightness is an estimate of brightness of an equivalent real scene corresponding to a scene represented by an image for display; and
a generator configured to generate the image for display by the display device by applying a blurring function representing a loss of focus relative to the focus of the image at the point of focus to simulate the derived expected depth of field of the image, wherein the blurring function applies blurring as a function of apparent spatial depth within the image by making rendered objects having a depth attribute different to that of a current point of focus appear to be unfocused, the blurring function being such that a degree of the blurring applied to a first depth region which is closer, in a first apparent depth direction, to the point of focus is lower than the degree of blurring applied to a second depth region which is further, in a second apparent depth direction, from the point of focus, and variation of the blurring function with respect to depth separation from the point of focus depends upon the expected depth of field.

20. A display device comprising the apparatus of claim 19.

* * * * *